US012764713B2

(12) United States Patent
Li et al.

(10) Patent No.: US 12,764,713 B2
(45) Date of Patent: Oct. 13, 2026

(54) METHOD AND APPARATUSES FOR GROUP PAGING FOR SIGNAL EFFICIENCY IN 5G NETWORK

(71) Applicant: INTERDIGITAL PATENT HOLDINGS, INC., Wilmington, DE (US)

(72) Inventors: Hongkun Li, Malvern, PA (US); Michael Starsinic, Newtown, PA (US); Quang Ly, North Wales, PA (US); Catalina Mladin, Hatboro, PA (US); Jiwan Ninglekhu, Royersford, PA (US); Pascal Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 238 days.

(21) Appl. No.: 18/558,399

(22) PCT Filed: May 5, 2022

(86) PCT No.: PCT/US2022/072134

§ 371 (c)(1),
(2) Date: Nov. 1, 2023

(87) PCT Pub. No.: WO2022/236300

PCT Pub. Date: Nov. 10, 2022

(65) Prior Publication Data

US 2024/0172175 A1 May 23, 2024

Related U.S. Application Data

(60) Provisional application No. 63/185,493, filed on May 7, 2021.

(51) Int. Cl.

| | |
|---|---|
| ***H04W 68/00*** | (2009.01) |
| ***H04W 4/06*** | (2009.01) |
| ***H04W 76/40*** | (2018.01) |

(52) U.S. Cl.

CPC ............. *H04W 68/00* (2013.01); *H04W 4/06* (2013.01); *H04W 76/40* (2018.02)

(58) Field of Classification Search

CPC ....... H04W 68/00; H04W 4/06; H04W 76/40; H04W 88/02; H04W 88/14; H04W 76/27;

(Continued)

(56) References Cited

U.S. PATENT DOCUMENTS

2005/0170842 A1* 8/2005 Chen ..................... H04L 12/185 455/454

2017/0094707 A1 3/2017 Lin et al.

(Continued)

OTHER PUBLICATIONS

3rd Generation Partnership Project; Technical Specification Group Services and System Aspects; Architectural enhancements for 5G multicast-broadcast services; Stage 2, (Release 17); 3GPP TS 23.247 V0.1.0, Mar. 2021; pp. 1-35.

(Continued)

*Primary Examiner* — Ayaz R Sheikh
*Assistant Examiner* — Mang Boi Thawng
(74) *Attorney, Agent, or Firm* — Flaster Greenberg P.C.

(57) ABSTRACT

A method and devices may assist in addressing signaling efficiency issues when the network aims to page a group of UEs in a multicast group so that the UEs will switch from CM-IDLE state to CM-CONNECTED state.

16 Claims, 14 Drawing Sheets

(58) Field of Classification Search
CPC ... H04W 72/005; H04W 72/30; H04W 76/11; H04L 12/189
See application file for complete search history.

(56) References Cited

U.S. PATENT DOCUMENTS

| | | | | |
|---|---|---|---|---|
| 2018/0376444 | A1* | 12/2018 | Kim | H04W 76/30 |
| 2022/0015063 | A1* | 1/2022 | Byun | H04W 76/40 |
| 2023/0188949 | A1* | 6/2023 | Jia | H04L 12/189 455/458 |
| 2024/0155340 | A1* | 5/2024 | Rajadurai | H04W 12/75 |
| 2024/0284485 | A1* | 8/2024 | Hong | H04W 4/06 |
| 2026/0095724 | A1* | 4/2026 | Li | H04W 4/06 |

OTHER PUBLICATIONS

3rd Generation Partnership Project; Technical Specification Group Services and System Aspects; Procedures for the 5G System (5G8); Stage 2, (Release 17); 3GPP TS 23.502 V17.0.0, Mar. 2021, pp. 1-646.
3rd Generation Partnership Project; Technical Specification Group Services and System Aspects; Procedures for the 5G System; Stage 2 (Release 15); 3GPP TS 23.502 V0.1.0, Jan. 2017, pp. 1-44.
3rd Generation Partnership Project; Technical Specification Group Services and System Aspects; Study on architectural enhancements for 5G multicast-broadcast services (Release 17); 3GPP TR 23.757 V2.0.0, Mar. 2021, pp. 1-297.

* cited by examiner

METHOD AND APPARATUSES FOR GROUP PAGING FOR SIGNAL EFFICIENCY IN 5G NETWORK

CROSS-REFERENCE TO RELATED APPLICATIONS

This application is the National Stage Application of International Patent Application No. PCT/US2022/072134, filed May 5, 2022, which claims the benefit of U.S. Provisional Patent Application No. 63/185,493, filed on May 7, 2021, entitled "Methods of Group Paging for Signal Efficiency In 5G Network," the contents of which are hereby incorporated by reference herein.

BACKGROUND

5G Network Architecture

FIG. 1 illustrates an exemplary 5G system in the non-roaming reference architecture with service-based interfaces within the Control Plane. FIG. 2 illustrates an exemplary 5G System architecture in the non-roaming case, using the reference point representation showing how various network functions interact with each other.

The end-to-end communications, between the application in the UE and the application in the external network, uses services provided by the 3GPP system, and optionally services provided by a services capability server (SCS), which resides in the DN.

This background information is provided to reveal information believed by the applicant to be of possible relevance. No admission is necessarily intended, nor should be construed, that any of the preceding information constitutes prior art.

SUMMARY

Disclosed herein are methods, systems, and devices that may assist in addressing a signaling efficiency issue when the network aims to page a group of UEs in a multicast group so that the UEs will switch from CM-IDLE state to CM-CONNECTED state.

In a first example, methods, systems, and devices may include a method of group paging performed during the MBS session activation procedure that may be used when the RAN node serving the UE supports the group paging mechanism.

In a second example, methods, systems, and devices may include a mechanism of paging a group of UEs in the multicast group that can be used if the RAN node serving the UE does not support the group paging mechanism. For example, first, a Group ID is used to page the UE, so that the UE knows the paging is related to a multicast group. Second, in the scenario where the RAN node serving the UE does not support the group paging mechanism, the network may update the RFSP index for the UE so that UE is more likely to select a RAN node that supports the group paging or 5G MBS service.

In a third example, methods, systems, and devices may include one or more modifications to existing control plane procedures between the UE and the network to facilitate the group paging. For a first approach, it is described how a support indication can be sent from the UE for the group paging during the registration related procedures. For a second approach, paging and Service request enhancement are described for the case where a UE camps on a Non-Supporting RAN Node. A service request may be used to trigger the UE to establish or activate an MBS session. A service request may also trigger the UE to execute a handover from a non-supporting RAN node to a supporting RAN node. For a third approach, the paging and service request procedures can be enhanced to support 5G Multicast and Broadcast Services (5MBS) in scenarios where a UE camps on a supporting RAN node.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Figure 1:
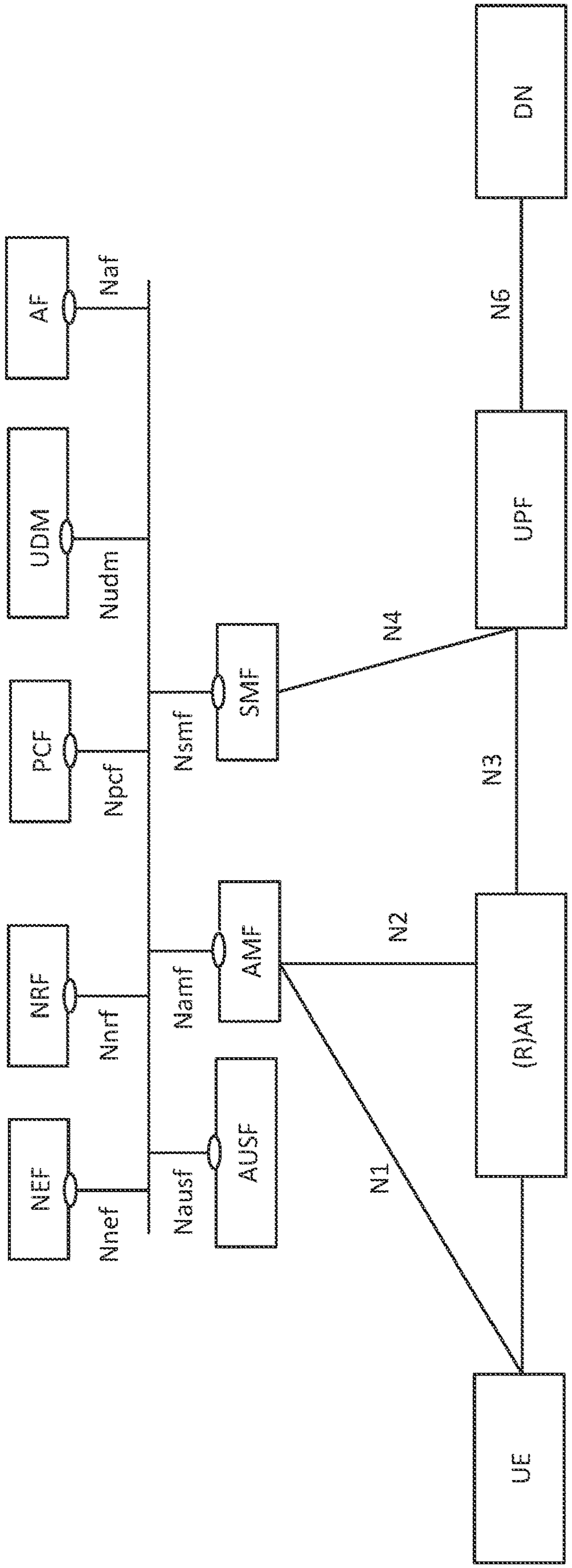
FIG. 1 illustrates an exemplary 5G system service-based architecture.
Figure 2:
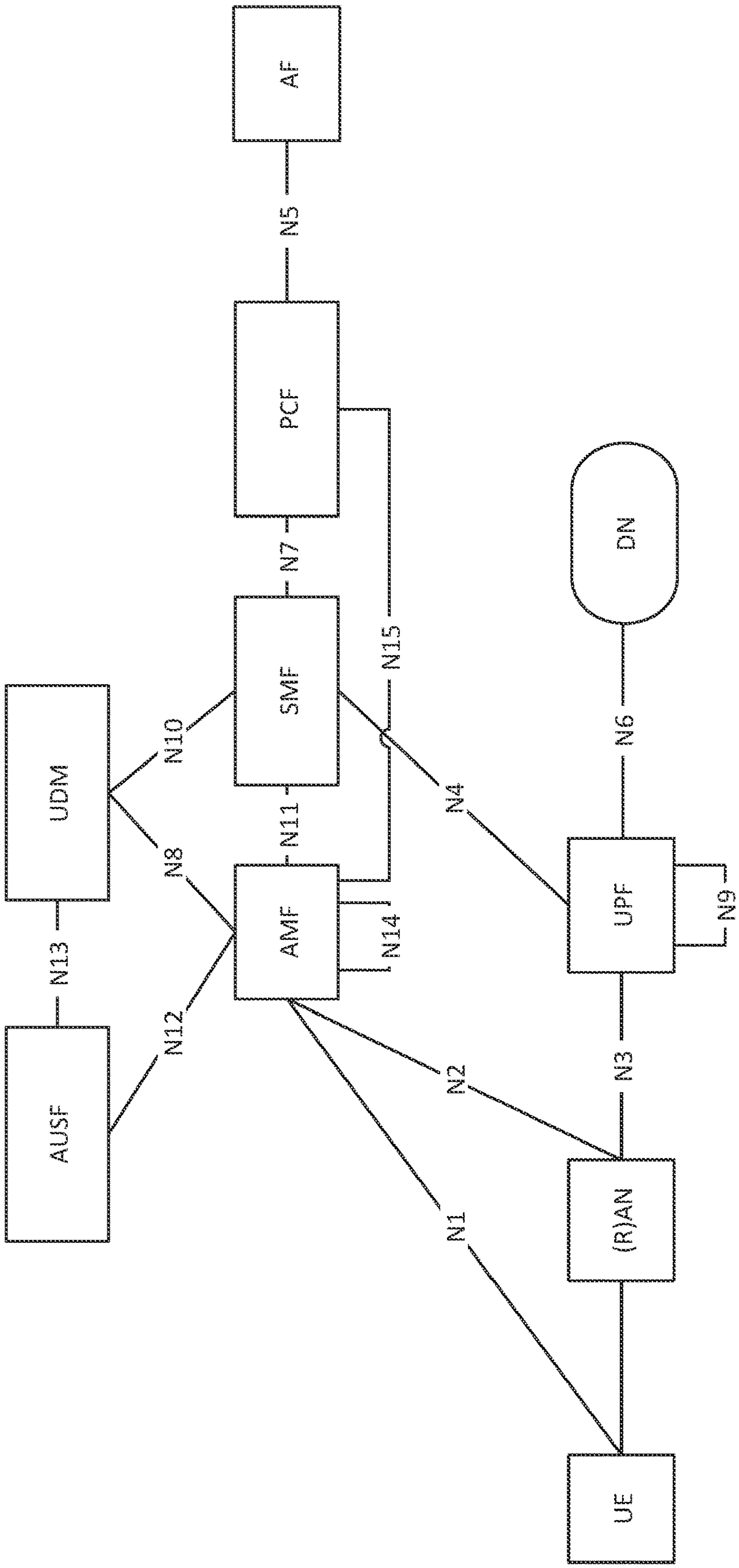
FIG. 2 illustrates an exemplary non-roaming 5g system architecture in reference point representation.
Figure 3A:
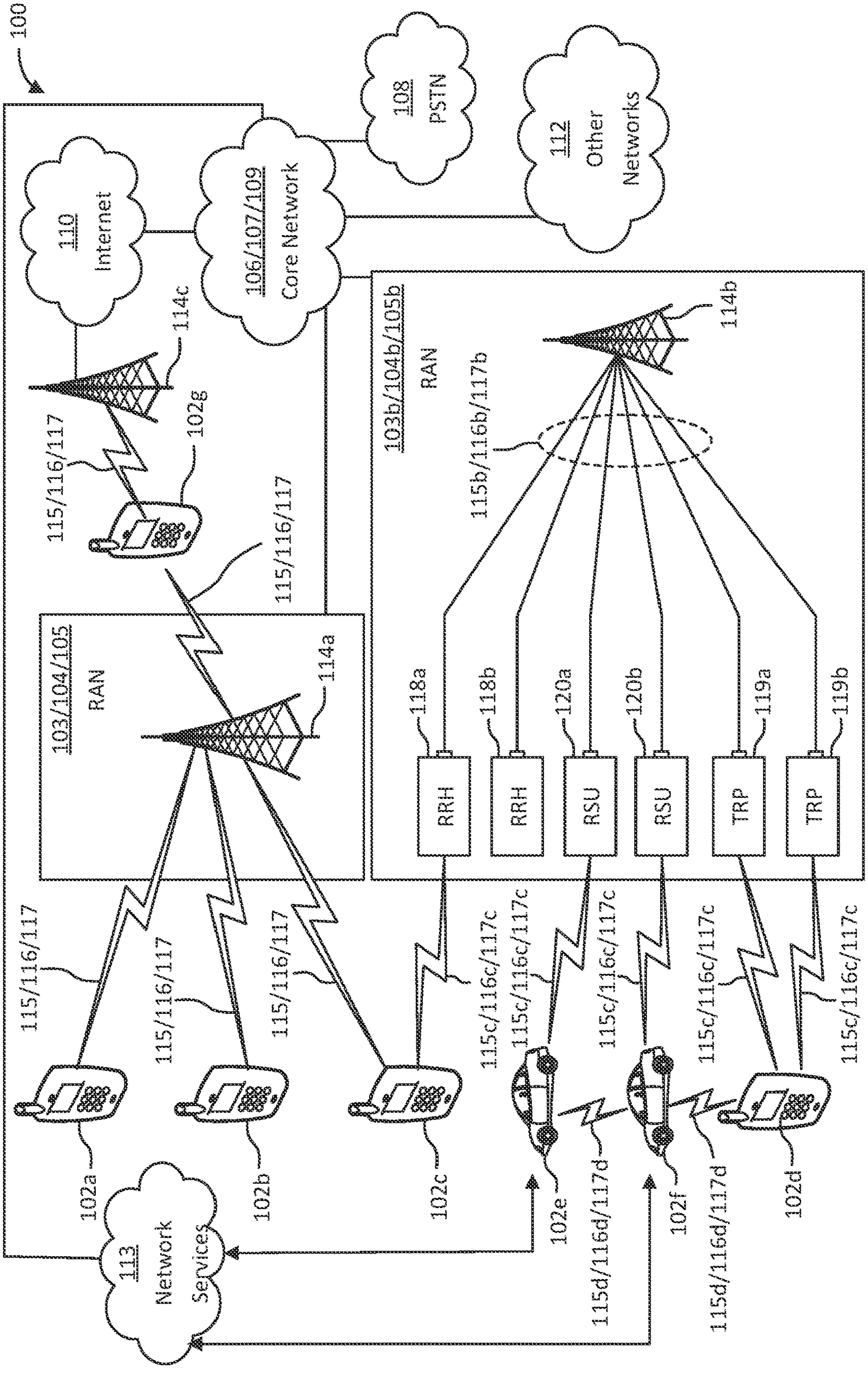
FIG. 3A illustrates an example communications system.
Figure 7:
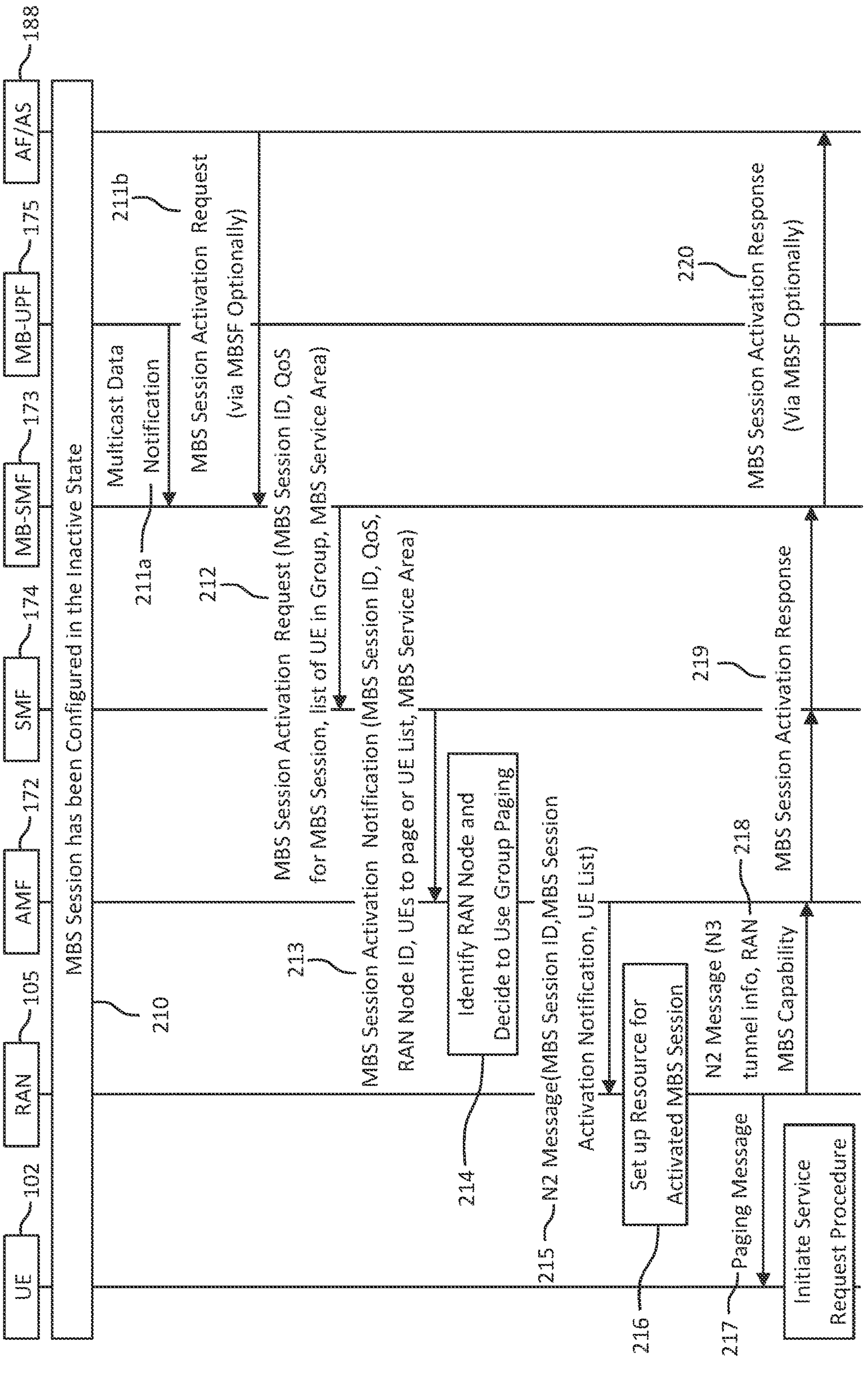
FIG. 7 illustrates an exemplary group paging in MBS Session Activation Procedure.

FIG. 3A illustrates an example communications system 100 in which the methods and apparatuses of group paging for signal efficiency in 5G network, such as the systems and methods illustrated in FIG. 7 described and claimed herein may be used. The communications system 100 may include wireless transmit/receive units (WTRUs) 102*a*, 102*b*, 102*c*, 102*d*, 102*e*, 102*f*, or 102*g* (which generally or collectively may be referred to as WTRU 102, WTRUs 102, or UE 102). The communications system 100 may include, a radio access network (RAN) 103/104/105/103*b*/104*b*/105*b*, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102*a*, 102*b*, 102*c*, 102*d*, 102*e*, 102*f*, or 102*g* may be any type of apparatus or device configured to operate or communicate in a wireless environment. Although each WTRU 102*a*, 102*b*, 102*c*, 102*d*, 102*e*, 102*f*, or 102*g* may be depicted in FIG. 3A, FIG. 3B, FIG. 3C, FIG. 3D, FIG. 3E, or FIG. 3F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114*a* and a base station 114*b*. In the example of FIG. 3A, each base stations 114*a* and 114*b* is depicted as a single element. In practice, the base stations 114*a* and 114*b* may include any number of interconnected base stations or network elements. Base stations 114*a* may be any type of device configured to wirelessly interface with at least one of the WTRUs 102*a*. 102*b*, and 102*c* to facilitate access to one or more communication networks, such as the core network 106/107/109, the Internet 110, Network Services 113, or the other networks 112. Similarly, base station 114*b* may be any type of device configured to wiredly or wirelessly interface with at least one of the Remote Radio Heads (RRHs) 118*a*, 118*b*, Transmission and Reception Points (TRPs) 119*a*, 119*b*, or Roadside Units (RSUs) 120*a* and 120*b* to facilitate access to one or more communication networks, such as the core network 106/107/109, the Internet 110, other networks 112, or Network Services 113. RRHs 118*a*, 118*b* may be any type of device configured to wirelessly interface with at least one of the WTRUs 102, e.g., WTRU 102*c*, to facilitate access to one or more communication networks, such as the core network 106/107/109, the Internet 110, Network Services 113, or other networks 112

TRPs 119*a*, 119*b* may be any type of device configured to wirelessly interface with at least one of the WTRU 102*d*, to facilitate access to one or more communication networks, such as the core network 106/107/109, the Internet 110, Network Services 113, or other networks 112. RSUs 120*a* and 120*b* may be any type of device configured to wirelessly interface with at least one of the WTRU 102*e* or 102*f*, to facilitate access to one or more communication networks, such as the core network 106/107/109, the Internet 110, other networks 112, or Network Services 113. By way of example, the base stations 114*a*, 114*b* may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114*a* may be part of the RAN 103/104/105, which may also include other base stations or network elements (not shown), such as a Base Station Controller (BSC), a Radio Network Controller (RNC), relay nodes, etc.

Similarly, the base station 114*b* may be part of the RAN 103*b*/104*b*/105*b*, which may also include other base stations or network elements (not shown), such as a BSC, a RNC, relay nodes, etc. The base station 114*a* may be configured to transmit or receive wireless signals within a particular geographic region, which may be referred to as a cell (not shown). Similarly, the base station 114*b* may be configured to transmit or receive wired or wireless signals within a particular geographic region, which may be referred to as a cell (not shown) for methods, systems, and devices of group paging for signal efficiency in 5G network, as disclosed herein. Similarly, the base station 114*b* may be configured to transmit or receive wired or wireless signals within a particular geographic region, which may be referred to as a cell (not shown). The cell may further be divided into cell sectors. For example, the cell associated with the base station 114*a* may be divided into three sectors. Thus, in an example, the base station 114*a* may include three transceivers, e.g., one for each sector of the cell. In an example, the base station 114*a* may employ multiple-input multiple output (MIMO) technology and, therefore, may utilize multiple transceivers for each sector of the cell.

The base stations 114*a* may communicate with one or more of the WTRUs 102*a*, 102*b*, 102*c*, or 102*g* over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114*b* may communicate with one or more of the RRHs 118*a*, 118*b*, TRPs 119*a*, 119*b*, or RSUs 120*a*, 120*b*, over a wired or air interface 115*b*/116*b*/117*b*, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115*b*/116*b*/117*b* may be established using any suitable radio access technology (RAT).

The RRHs 118*a*, 118*b*, TRPs 119*a*, 119*b* or RSUs 120*a*, 120*b*, may communicate with one or more of the WTRUs 102*c*, 102*d*, 102*e*, 102*f* over an air interface 115*c*/116*c*/117*c*, which may be any suitable wireless communication link (e.g., radio frequency (RF), microwave, infrared (IR), ultraviolet (UV), visible light, cmWave, mmWave, etc.). The air interface 115*c*/116*c*/117*c* may be established using any suitable radio access technology (RAT).

The WTRUs 102*a*, 102*b*, 102*c*, 102*d*, 102*e*, or 102*f* may communicate with one another over an air interface 115*d*/116*d*/117*d*, such as Sidelink communication, which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114*a* and the WTRUs 102*a*, 102*b*, 102*c*, or RRHs 118*a*, 118*b*, TRPs 119*a*, 119*b*, or RSUs 120*a*, 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) or LTE-Advanced (LTE-A). In the future, the air interface 115/116/117 or 115*c*/116*c*/117*c* may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114*a* in the RAN 103/104/105 and the WTRUs 102*a*, 102*b*, 102*c*, and 102*g* or RRHs 118*a*, 118*b*, TRPs 119*a*, 119*b* or RSUs 120*a*, 120*b* in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 3A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of group paging for signal efficiency in 5G network, as disclosed herein. In an example, the base station 114*c* and the WTRUs 102, e.g., WTRU 102*e*, may implement a radio technology such as IEEE 802.11 to establish a wireless local area network (WLAN). similarly, the base station 114*c* and the WTRUs 102*d*, may implement a radio technology such as IEEE 802.15 to establish a wireless personal area network (WPAN). In yet another example, the base station 114*c* and the WTRUs 102, e.g., WTRU 102*e*, may utilize a cellular-based RAT (e.g., WCDMA, CDMA2000, GSM, LTE, LTE-A, NR, etc.) to establish a picocell or femtocell. As shown in FIG. 3A, the base station 114*c* may have a direct connection to the Internet 110. Thus, the base station 114*c* may not be required to access the Internet 110 via the core network 106/107/109.

The RAN 103/104/105 or RAN 103*b*/104*b*/105*b* may be in communication with the core network 106/107/109, which may be any type of network configured to provide voice, data, messaging, authorization and authentication, applications, or voice over internet protocol (VOIP) services to one or more of the WTRUs 102*a*, 102*b*, 102*c*, 102*d*. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 3A, it will be appreciated that the RAN 103/104/105 or RAN 103*b*/104*b*/105*b* or the core network 106/107/109 may be in direct or indirect communication with other RANs that employ the same RAT as the RAN 103/104/105 or RAN 103*b*/104*b*/105*b* or a different RAT. For example, in addition to being connected to the RAN 103/104/105 or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102*a*, 102*b*, 102*c*, 102*d*, 102*e* to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*, 102*e*, and 102*f* may include multiple transceivers for communicating with different wireless networks over different wireless links for implementing methods, systems, and devices of group paging for signal efficiency in 5G network, as disclosed herein. For example, the WTRU 102*g* shown in FIG. 3A may be configured to communicate with the base station 114*a*, which may employ a cellular-based radio technology, and with the base station 114*c*, which may employ an IEEE 802 radio technology.

Although not shown in FIG. 3A, it will be appreciated that a User Equipment may make a wired connection to a gateway. The gateway maybe a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115*c*/116*c*/117*c* may equally apply to a wired connection.

Figure 3B:
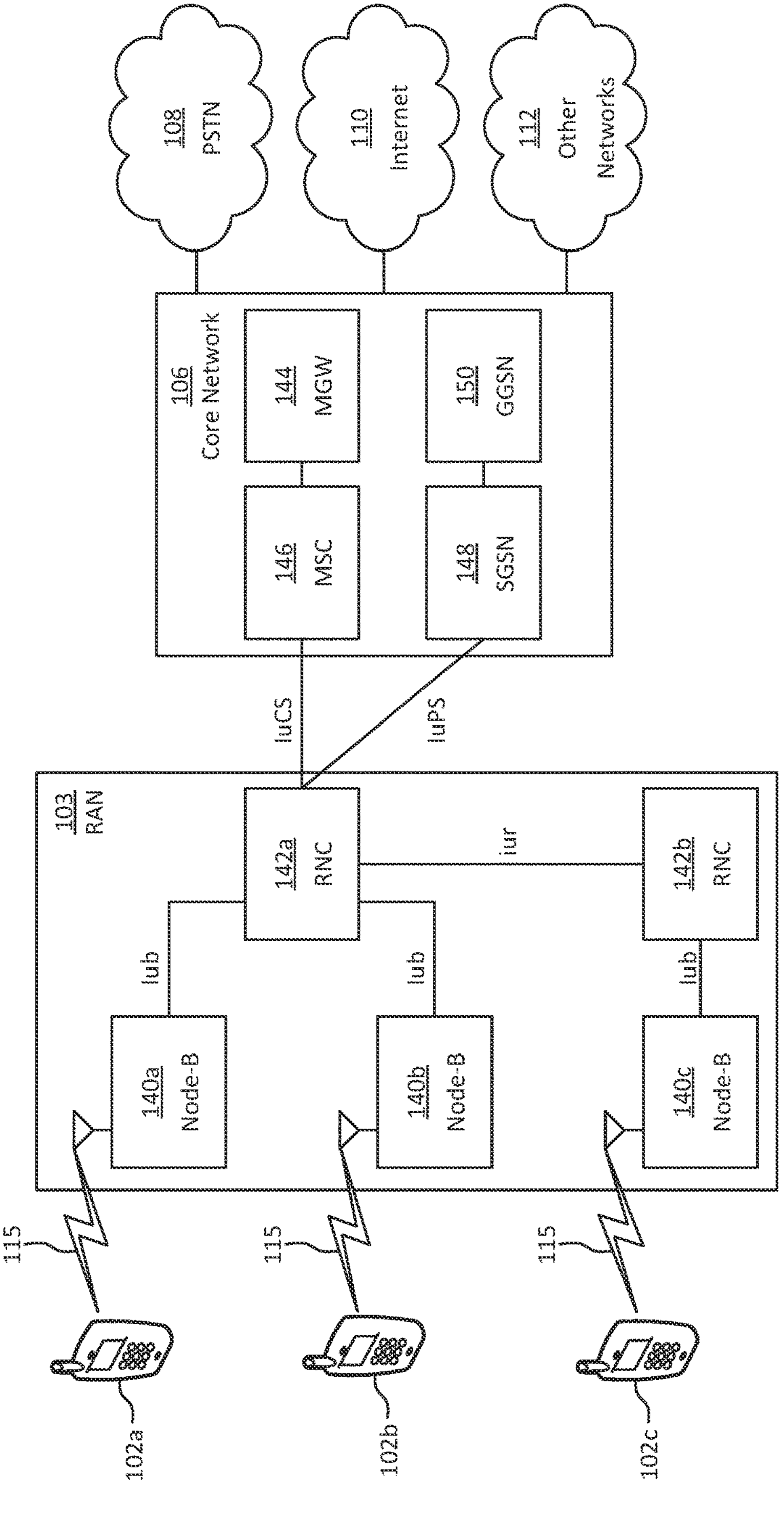
FIG. 3B illustrates an exemplary system that includes RANs and core networks.

FIG. 3B is a system diagram of an example RAN 103 and core network 106 that may implement methods, systems, and devices of group paging for signal efficiency in 5G network, as disclosed herein. As noted above, the RAN 103 may employ a UTRA radio technology to communicate with the WTRUs 102*a*, 102*b*, and 102*c* over the air interface 115. The RAN 103 may also be in communication with the core network 106. As shown in FIG. 3B, the RAN 103 may include Node-Bs 140*a*, 140*b*, and 140*c*, which may each include one or more transceivers for communicating with the WTRUs 102*a*, 102*b*, and 102*c* over the air interface 115. The Node-Bs 140*a*, 140*b*, and 140*c* may each be associated with a particular cell (not shown) within the RAN 103. The RAN 103 may also include RNCs 142*a*, 142*b*. It will be appreciated that the RAN 103 may include any number of Node-Bs and Radio Network Controllers (RNCs.)

As shown in FIG. 3B, the Node-Bs 140*a*, 140*b* may be in communication with the RNC 142*a*. Additionally, the Node-B 140*c* may be in communication with the RNC 142*b*. The Node-Bs 140*a*, 140*b*, and 140*c* may communicate with the respective RNCs 142*a* and 142*b* via an Iub interface. The RNCs 142*a* and 142*b* may be in communication with one another via an Iur interface. Each of the RNCs 142*a* and 142*b* may be configured to control the respective Node-Bs 140*a*, 140*b*, and 140*c* to which it is connected. In addition, each of the RNCs 142*a* and 142*b* may be configured to carry out or support other functionality, such as outer loop power control, load control, admission control, packet scheduling, handover control, macro-diversity, security functions, data encryption, and the like.

The core network 106 shown in FIG. 3B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142*a* in the RAN 103 may be connected to the MSC 146 in the core network 106 via an IuCS interface. The MSC 146 may be connected to the MGW 144. The MSC 146 and the MGW 144 may provide the WTRUs 102*a*, 102*b*, and 102*c* with access to circuit-switched networks, such as the PSTN 108, to facilitate communications between the WTRUs 102*a*, 102*b*, and 102*c*, and traditional land-line communications devices.

The RNC 142*a* in the RAN 103 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, and 102*c* with access to packet-switched networks, such as the Internet 110, to facilitate communications between and the WTRUs 102*a*, 102*b*, and 102*c*, and IP-enabled devices.

The core network 106 may also be connected to the other networks 112, which may include other wired or wireless networks that are owned or operated by other service providers.

Figure 3C:
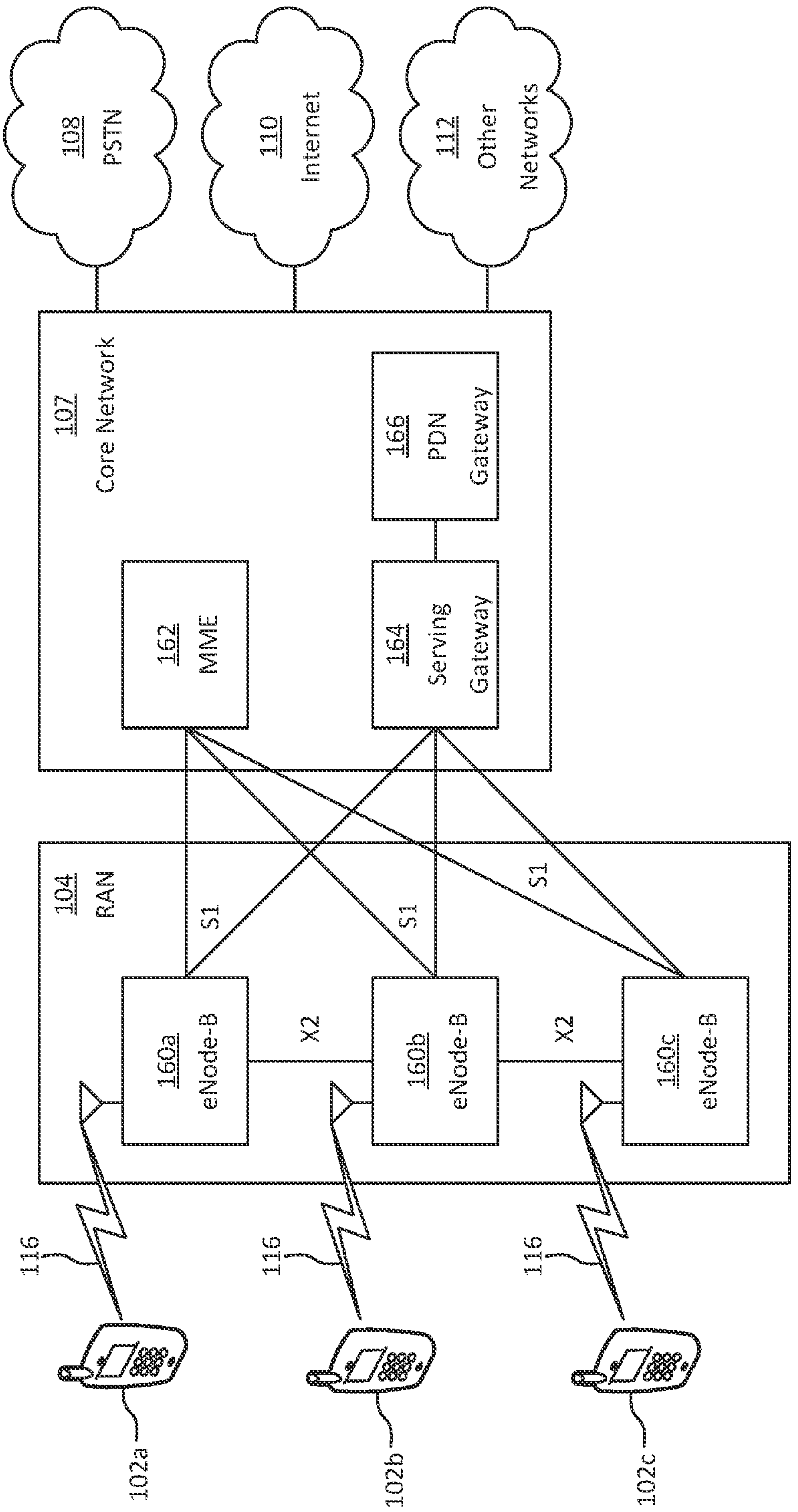
FIG. 3C illustrates an exemplary system that includes RANs and core networks.

FIG. 3C is a system diagram of an example RAN 104 and core network 107 that may implement methods, systems, and devices of group paging for signal efficiency in 5G network, as disclosed herein. As noted above, the RAN 104 may employ an E-UTRA radio technology to communicate with the WTRUs 102*a*, 102*b*, and 102*c* over the air interface 116. The RAN 104 may also be in communication with the core network 107.

The RAN 104 may include eNode-Bs 160*a*, 160*b*, and 160*c*, though it will be appreciated that the RAN 104 may include any number of eNode-Bs. The eNode-Bs 160*a*, 160*b*, and 160*c* may each include one or more transceivers for communicating with the WTRUs 102*a*, 102*b*, and 102*c* over the air interface 116. For example, the eNode-Bs 160*a*, 160*b*, and 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink or downlink, and the like. As shown in FIG. 3C, the eNode-Bs 160*a*, 160*b*, and 160*c* may communicate with one another over an X2 interface.

The core network 107 shown in FIG. 3C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160*a*, 160*b*, and 160*c* in the RAN 104 via an SI interface and may serve as a control node. For example, the MME 162 may be responsible for authenticating users of the WTRUs 102*a*, 102*b*, and 102*c*, bearer activation/deactivation, selecting a particular serving gateway during an initial attach of the WTRUs 102*a*, 102*b*, and 102*c*, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160*a*. 160*b*, and 160*c* in the RAN 104 via the SI interface. The serving gateway 164 may generally route and forward user data packets to/from the WTRUs 102*a*, 102*b*, and 102*c*. The serving gateway 164 may also perform other functions, such as anchoring user planes during inter-eNode B handovers, triggering paging when downlink data is available for the WTRUs 102*a*, 102*b*, and 102*c*, managing and storing contexts of the WTRUs 102*a*, 102*b*, and 102*c*, and the like.

The serving gateway 164 may also be connected to the PDN gateway 166, which may provide the WTRUs 102*a*, 102*b*, and 102*c* with access to packet-switched networks, such as the Internet 110, to facilitate communications between the WTRUs 102*a*, 102*b*, 102*c*, and IP-enabled devices.

The core network 107 may facilitate communications with other networks. For example, the core network 107 may provide the WTRUs 102*a*, 102*b*, and 102*c* with access to circuit-switched networks, such as the PSTN 108, to facilitate communications between the WTRUs 102*a*, 102*b*, and 102*c* and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102*a*, 102*b*, and 102*c* with access to the networks 112, which may include other wired or wireless networks that are owned or operated by other service providers.

Figure 3D:
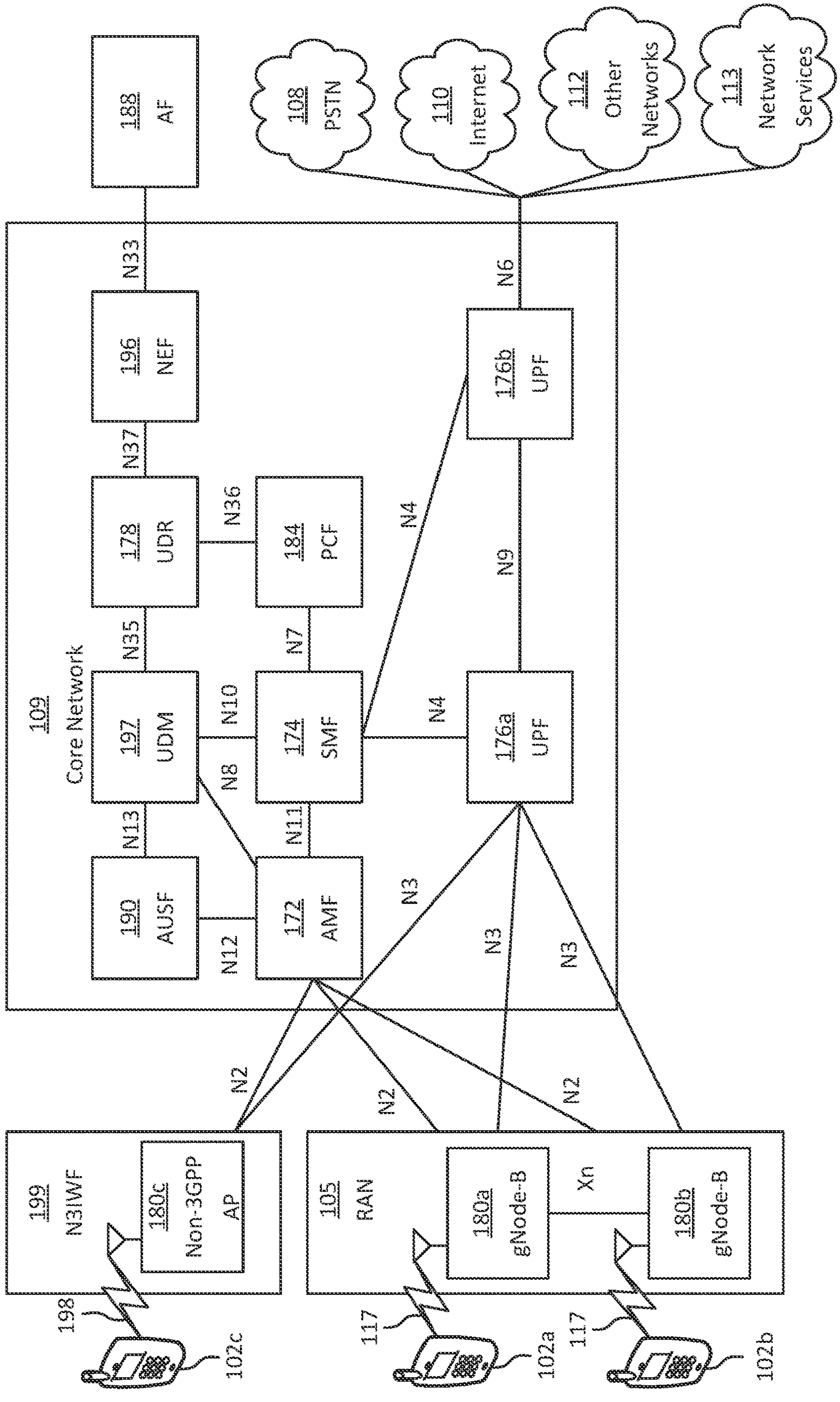
FIG. 3D illustrates an exemplary system that includes RANs and core networks.

FIG. 3D is a system diagram of an example RAN 105 and core network 109 that may implement methods, systems, and devices of group paging for signal efficiency in 5G network, as disclosed herein. The RAN 105 may employ an NR radio technology to communicate with the WTRUs 102*a* and 102*b* over the air interface 117. The RAN 105 may also be in communication with the core network 109. A Non-3GPP Interworking Function (N3IWF) 199 may employ a non-3GPP radio technology to communicate with the WTRU 102*c* over the air interface 198. The N3IWF 199 may also be in communication with the core network 109.

The RAN 105 may include gNode-Bs 180*a* and 180*b*. It will be appreciated that the RAN 105 may include any number of gNode-Bs. The gNode-Bs 180*a* and 180*b* may each include one or more transceivers for communicating with the WTRUs 102*a* and 102*b* over the air interface 117. When integrated access and backhaul connection are used, the same air interface may be used between the WTRUs and gNode-Bs, which may be the core network 109 via one or multiple gNBs. The gNode-Bs 180*a* and 180*b* may implement MIMO, MU-MIMO, or digital beamforming technology. Thus, the gNode-B 180*a*, for example, may use multiple antennas to transmit wireless signals to, and receive wireless signals from, the WTRU 102*a*. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180*c*. It will be appreciated that the N3IWF 199 may include any number of non-3GPP Access Points. The non-3GPP Access Point 180*c* may include one or more transceivers for communicating with the WTRUs 102*c* over the air interface 198. The non-3GPP Access Point 180*c* may use the 802.11 protocol to communicate with the WTRU 102*c* over the air interface 198.

Each of the gNode-Bs 180*a* and 180*b* may be associated with a particular cell (not shown) and may be configured to handle radio resource management decisions, handover decisions, scheduling of users in the uplink or downlink, and the like. As shown in FIG. 3D, the gNode-Bs 180*a* and 180*b* may communicate with one another over an Xn interface, for example.

The core network (CN) 109 shown in FIG. 3D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 3G.

In the example of FIG. 3D, the 5G Core Network 109 may include an access and mobility management function (AMF) 172, a Session Management Function (SMF) 174, User Plane Functions (UPFs) 176*a* and 176*b*, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 3D shows that network functions directly connect with one another, however, it should be appreciated that they may communicate via routing agents such as a diameter routing agent or message buses.

In the example of FIG. 3D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102*a*. 102*b*, and 102*c* via an N1 interface. The N1 interface is not shown in FIG. 3D.

The SMF 174 may be connected to the AMF 172 via an N11 interface. Similarly, the SMF may be connected to the PCF 184 via an N7 interface, and to the UPFs 176*a* and 176*b* via an N4 interface. The SMF 174 may serve as a control node. For example, the SMF 174 may be responsible for Session Management, IP address allocation for the WTRUs 102*a*, 102*b*, and 102*c*, management and configuration of traffic steering rules in the UPF 176*a* and UPF 176*b*, and generation of downlink data notifications to the AMF 172.

The UPF 176*a* and UPF 176*b* may provide the WTRUs 102*a*, 102*b*, and 102*c* with access to a Packet Data Network (PDN), such as the Internet 110, to facilitate communications between the WTRUs 102*a*, 102*b*, and 102*c* and other devices. The UPF 176*a* and UPF 176*b* may also provide the WTRUs 102*a*, 102*b*, and 102*c* with access to other types of packet data networks. For example, Other Networks 112 may be Ethernet Networks or any type of network that exchanges packets of data. The UPF 176*a* and UPF 176*b* may receive traffic steering rules from the SMF 174 via the N4 interface. The UPF 176*a* and UPF 176*b* may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102*c* and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 3D. The PCF 184 may provide policy rules to control plane nodes such as the AMF 172 and SMF 174, allowing the control plane nodes to enforce these rules. The PCF 184 may send policies to the AMF 172 for the WTRUs 102*a*. 102*b*, and 102*c* so that the AMF may deliver the policies to the WTRUs 102*a*. 102*b*, and 102*c* via an N1 interface. Policies may then be enforced, or applied, at the WTRUs 102*a*, 102*b*, and 102*c*.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g., in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 3D, in a network slicing scenario, a WTRU 102*a*, 102*b*, or 102*c* may connect with an AMF 172, via an N1 interface. The AMF may be logically part of one or more slices. The AMF may coordinate the connection or communication of WTRU 102*a*, 102*b*, or 102*c* with one or more UPF 176*a* and 176*b*, SMF 174, and other network functions. Each of the UPFs 176*a* and 176*b*, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102*a*, 102*b*, and 102*c* and servers or applications functions 188. In addition, the core network 170 may provide the WTRUs 102*a*, 102*b*, and 102*c* with access to the networks 112, which may include other wired or wireless networks that are owned or operated by other service providers.

The core network entities described herein and illustrated in FIG. 3A, FIG. 3C, FIG. 3D, or FIG. 3E are identified by the names given to those entities in certain existing 3GPP specifications, but it is understood that in the future those entities and functionalities may be identified by other names and certain entities, or functions may be combined in future specifications published by 3GPP, including future 3GPP NR specifications. Thus, the particular network entities and functionalities described and illustrated in FIG. 3A, FIG. 3B, FIG. 3C, FIG. 3D, or FIG. 3E are provided by way of example only, and it is understood that the subject matter disclosed and claimed herein may be embodied or implemented in any similar communication system, whether presently defined or defined in the future.

Figure 3E:
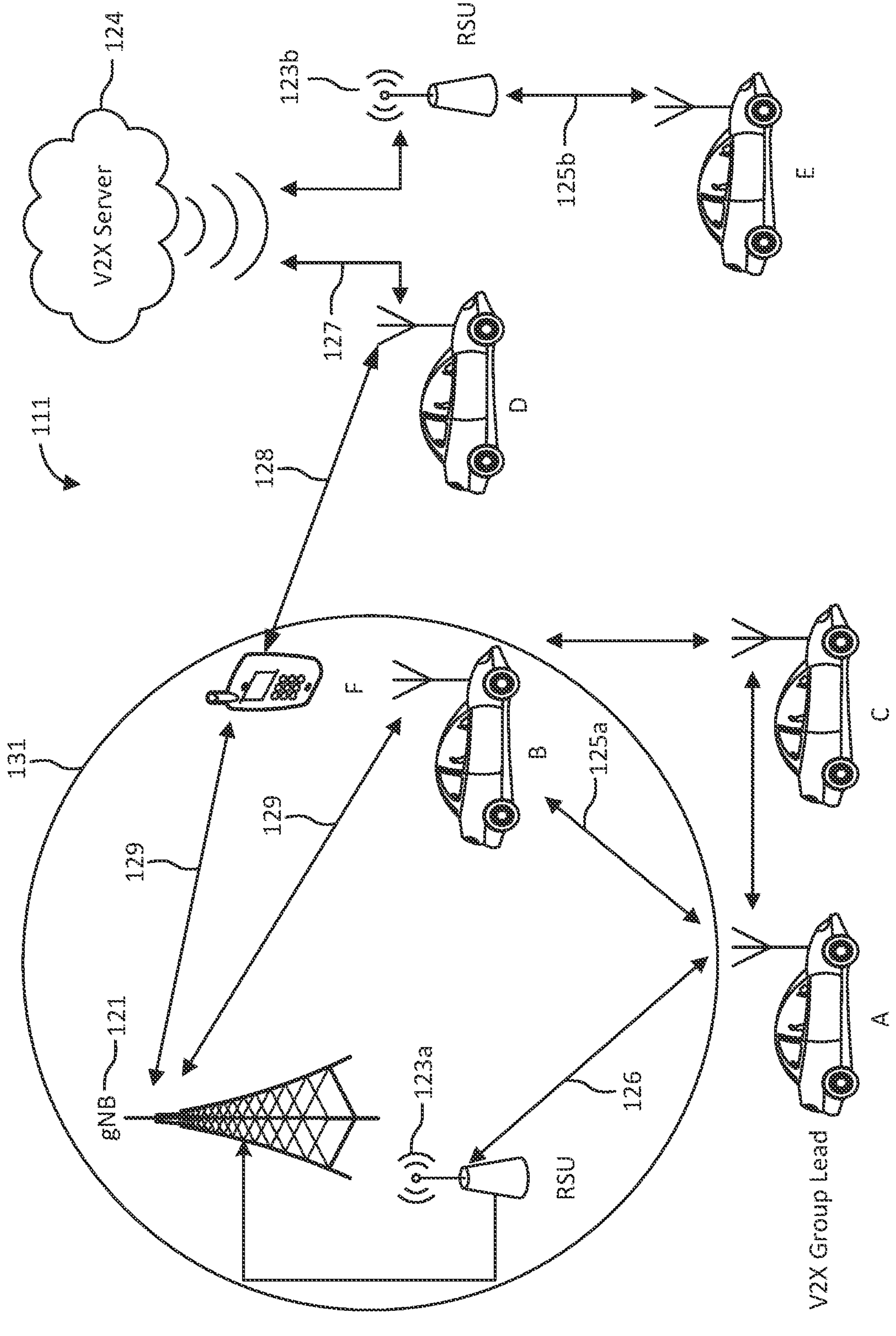
FIG. 3E illustrates another example communications system.

FIG. 3E illustrates an example communications system 111 in which the systems, methods, apparatuses that implement group paging for signal efficiency in 5G network, described herein, may be used. Communications system 111 may include Wireless Transmit/Receive Units (WTRUS) A, B, C, D, E, F, a base station gNB 121, a V2X server 124, and Roadside Units (RSUs) 123*a* and 123*b*. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUS A, B, C, D, E, and F may communicate with each other over a Uu interface 129 via the gNB 121 if they are within the access network coverage 131. In the example of FIG. 3E, WTRUs B and F are shown within access network coverage 131. WTRUs A, B, C, D, E, and F may communicate with each other directly via a Sidelink interface (e.g., PC5 or NR PC5) such as interface 125*a*, 125*b*, or 128, whether they are under the access network coverage 131 or out of the access network coverage 131. For instance, in the example of FIG. 3E, WRTU D, which is outside of the access network coverage 131, communicates with WTRU F, which is inside the coverage 131.

WTRUs A, B, C, D, E, and F may communicate with RSU 123*a* or 123*b* via a Vehicle-to-Network (V2N) 133 or Sidelink interface 125*b*. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 3F:
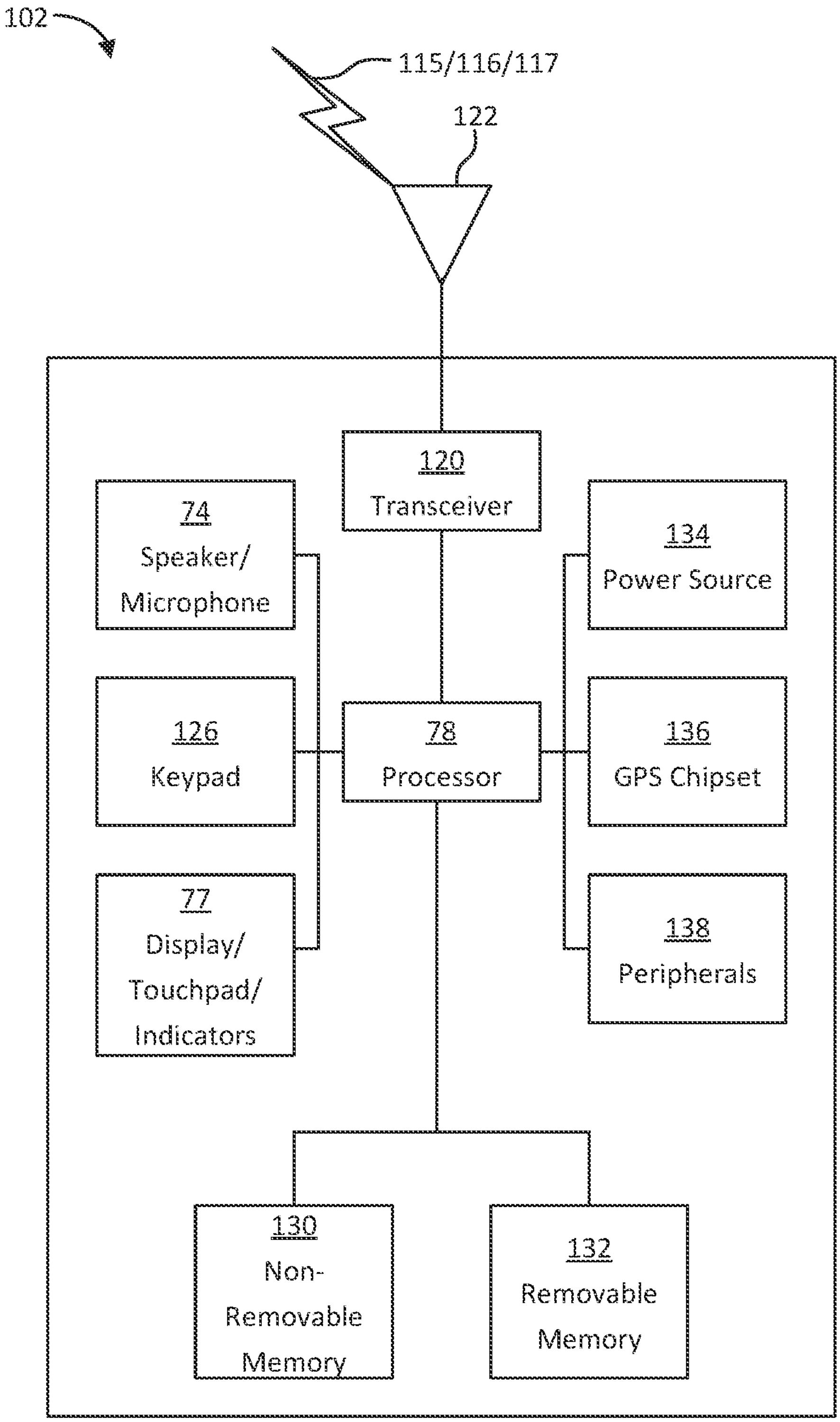
FIG. 3F is a block diagram of an example apparatus or device, such as a WTRU.

FIG. 3F is a block diagram of an example apparatus or device WTRU 102 that may be configured for wireless communications and operations in accordance with the systems, methods, and apparatuses that implement group paging for signal efficiency in 5G network, described herein, such as a WTRU 102 of FIG. 3A, FIG. 3B, FIG. 3C, FIG. 3D, or FIG. 3E, or FIG. 1-FIG. 8 (e.g., UE). As shown in FIG. 3F, the example WTRU 102 may include a processor 78, a transceiver 120, a transmit/receive element 122, a speaker/microphone 74, a keypad 126, a display/touchpad/indicators 77, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114*a* and 114*b*, or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 3F and may be an exemplary implementation that performs the disclosed systems and methods for group paging for signal efficiency in 5G network described herein.

The processor 78 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 78 may perform signal coding, data processing, power control, input/output processing, or any other functionality that enables the WTRU 102 to operate in a wireless environment. The processor 78 may be coupled to the transceiver 120, which may be coupled to the transmit/receive element 122. While FIG. 3F depicts the processor 78 and the transceiver 120 as separate components, it will be appreciated that the processor 78 and the transceiver 120 may be integrated together in an electronic package or chip.

The transmit/receive element 122 of a UE may be configured to transmit signals to, or receive signals from, a base station (e.g., the base station 114*a* of FIG. 3A) over the air interface 115/116/117 or another UE over the air interface 115*d*/116*d*/117*d*. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 3F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 78 of the WTRU 102 may be coupled to, and may receive user input data from, the speaker/microphone 74, the keypad 126, or the display/touchpad/indicators 77 (e.g., a liquid crystal display (LCD) display unit or organic light-emitting diode (OLED) display unit. The processor 78 may also output user data to the speaker/microphone 74, the keypad 126, or the display/touchpad/indicators 77. In addition, the processor 78 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 78 may access information from, and store data in, memory that is not physically located on the WTRU 102, such as on a server that is hosted in the cloud or in an edge computing platform or in a home computer (not shown). The processor 78 may be configured to control lighting patterns, images, or colors on the display or indicators 77 in response to whether the setup in some of the examples described herein are successful or unsuccessful, or otherwise indicate a status of group paging for signal efficiency in 5G network and associated components. The control lighting patterns, images, or colors on the display or indicators 77 may be reflective of the status of any of the method flows or components in the FIG.'s illustrated or discussed herein (e.g., FIG. 1-FIG. 8, etc.). Disclosed herein are messages and procedures of group paging for signal efficiency in 5G network. The messages and procedures may be extended to provide interface/API for users to request resources via an input source (e.g., speaker/microphone 74, keypad 126, or display/touchpad/indicators 77) and request, configure, or query group paging for signal efficiency in 5G network related information, among other things that may be displayed on display 77.

The processor 78 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 78 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114*a*, 114*b*) or determine its location based on the timing of the signals being received from two or more nearby base stations. It will be appreciated that the WTRU 102 may acquire location information by way of any suitable location-determination method.

The processor 78 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth®: module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 3G:
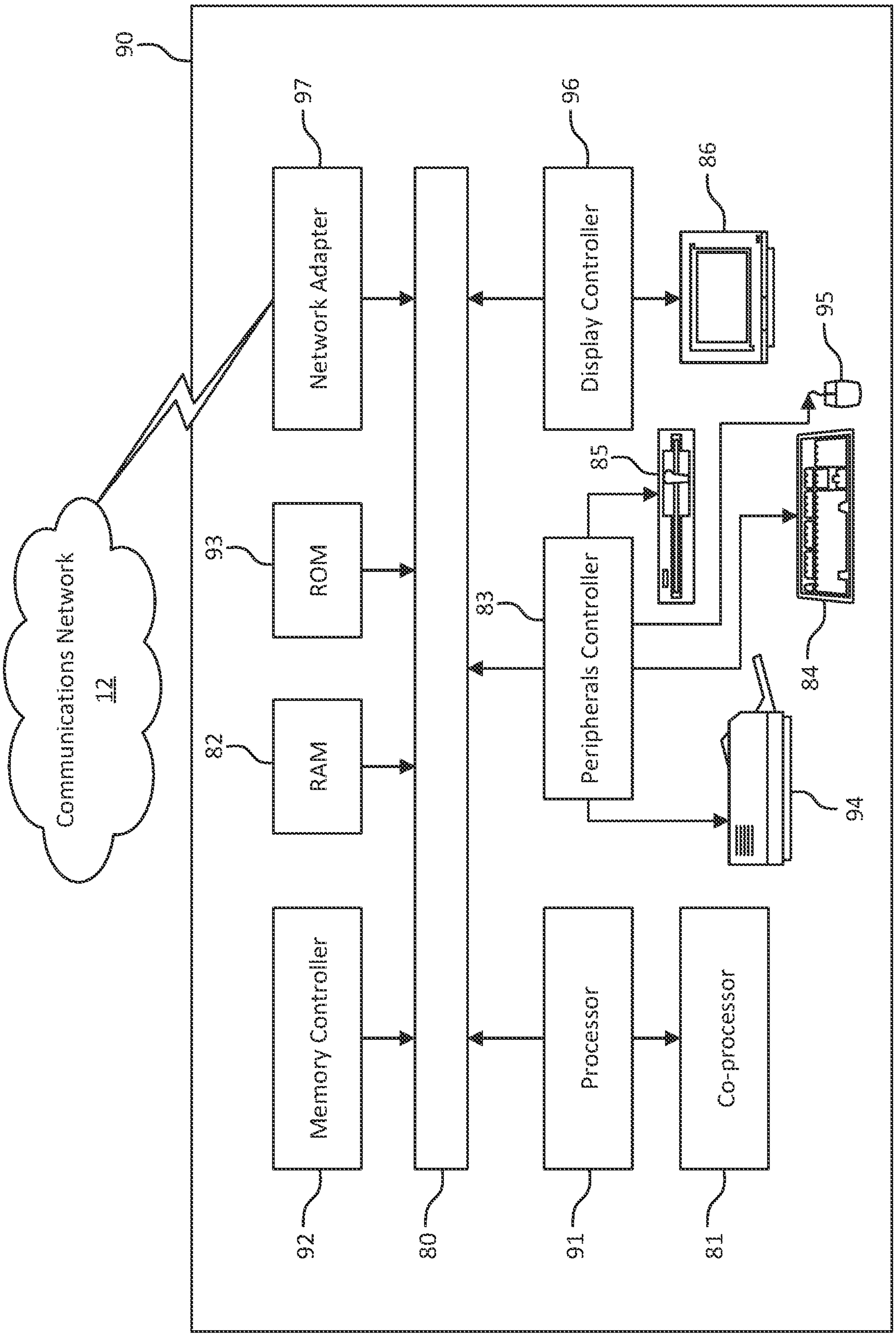
FIG. 3G is a block diagram of an exemplary computing system.
Figure 4:
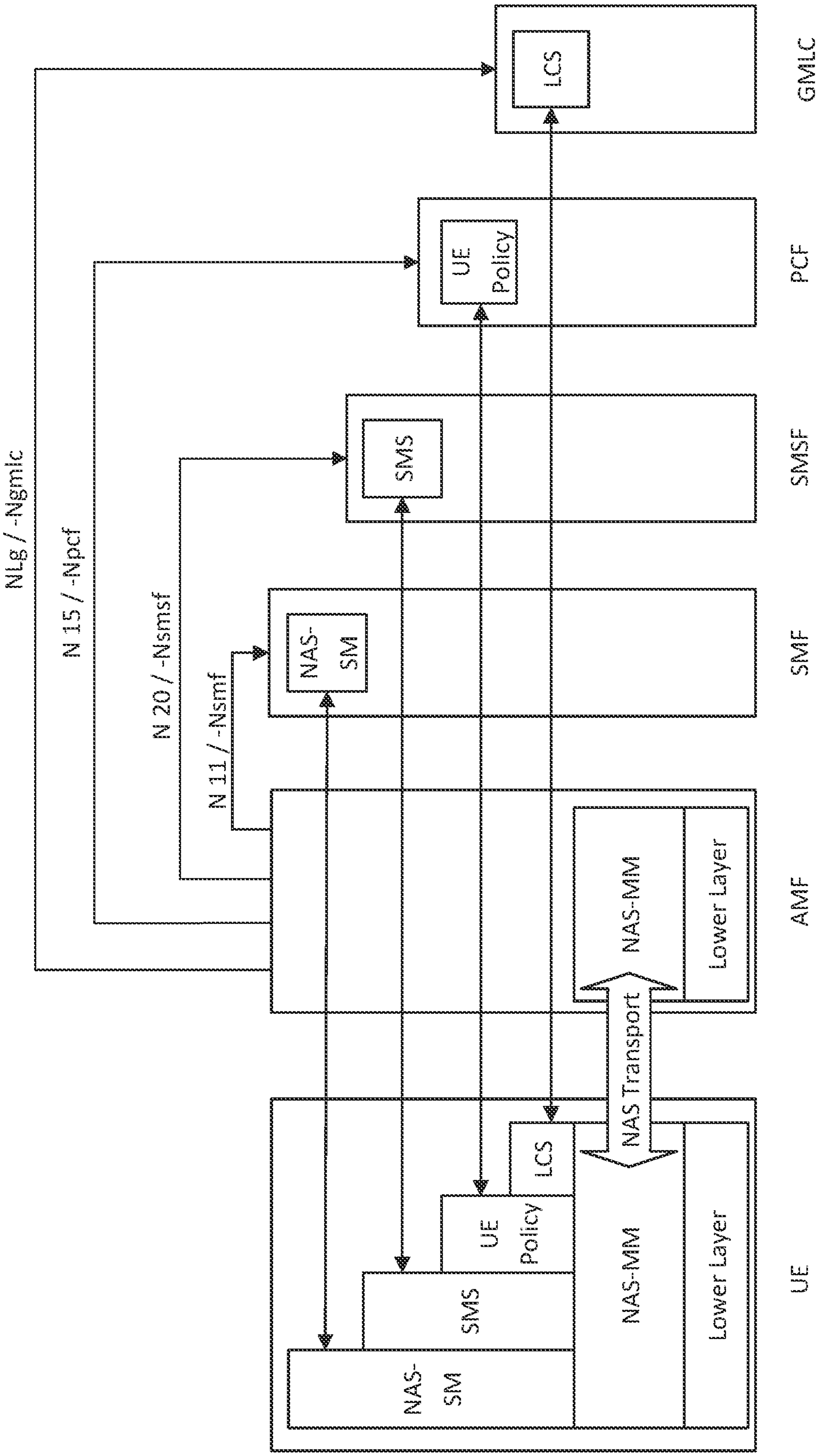
FIG. 4 illustrates an exemplary NAS transport for SM, SMS, UE Policy and LCS.

FIG. 3G is a block diagram of an exemplary computing system 90 in which one or more apparatuses of the communications networks illustrated in FIG. 3A, FIG. 3C, FIG. 3D and FIG. 3E as well as group paging for signal efficiency in 5G network, such as the systems and methods illustrated in FIG. 1 through FIG. 8 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for group paging for signal efficiency in 5G network, such as receiving messages.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space: it cannot access memory within another process's virtual address space unless memory sharing between the processes has been set up.

In addition, computing system 90 may include peripherals controller 83 responsible for communicating instructions from processor 91 to peripherals, such as printer 94, key board 84, mouse 95, and disk drive 85.

Display 86, which is controlled by display controller 96, is used to display visual output generated by computing system 90). Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 3A, FIG. 3B, FIG. 3C, FIG. 3D, or FIG. 3E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 78 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable, and non-removable media implemented in any non-transitory (e.g., tangible, or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information, and which may be accessed by a computing system.

Control Plane Protocol Stack

It is worth noting that the mobility management and session management functions may be separated. A single N1 NAS connection may be used for Registration Management or Connection Management (RM/CM) or for SM-related messages and procedures for a UE. The single N1 termination point may be located in AMF 172. AMF 172 may forward SM related NAS information to SMF 174. AMF 172 may handle the registration management and connection management of NAS signaling exchanged with the UE, while SMF 174 may handle the session management of NAS signaling exchanged with the UE 102.

In addition, the architecture may define several types of control signaling that may be transferred on top of NAS-MM protocol, such as UE policy between PCF 184 and UE 102, Location Service (LCS) between Gateway Mobile Location Centre (GMLC) and UE 102.

Figure 5:
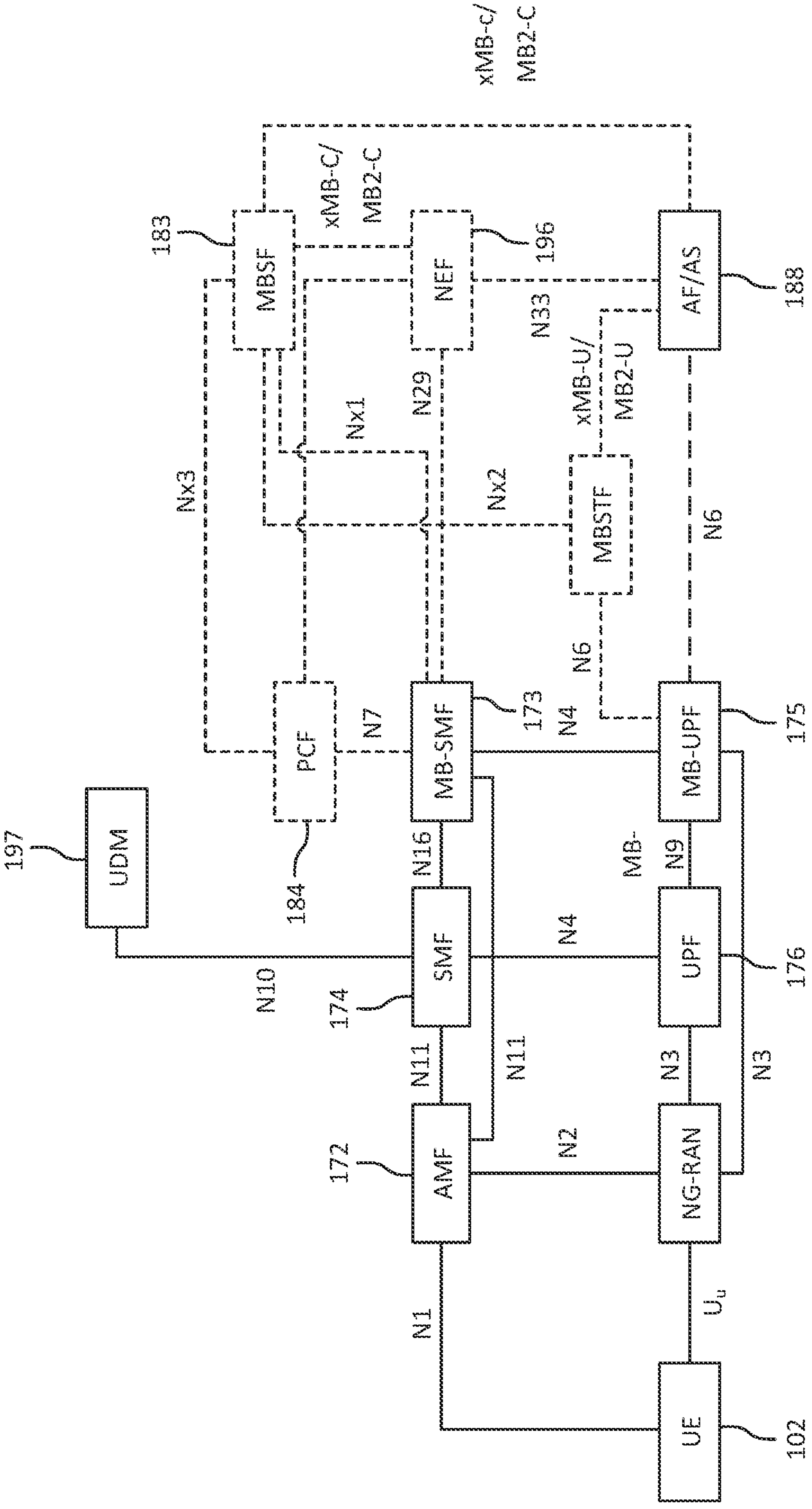
FIG. 5 illustrates an exemplary 5G MBS Architecture in Reference Point Representation.

Architectural Enhancements for 5G Multicast/Broadcast Service (MBS)—5G MBS Architecture FIG. 5 depicts the 5G MBS system architecture using the reference point representation showing how various network functions (NF) interact with each other. Some of the existing interfaces (e.g., N1, N2, N10, N11, or N16) may be enhanced to support 5G MBS. A NF may be a processing function in a network, which has defined functional behavior and defined interfaces. A NF may be implemented either as a network element on a dedicated hardware, or as a software instance running on a dedicated hardware, or as a virtualized function instantiated on an appropriate platform, e.g., on a cloud infrastructure. MBS service area may be the area within which data of one or multiple multicast or broadcast session(s) may be sent.

The MB-SMF 173 may be an enhanced SMF and the MB-UPF 175 may be an enhanced UPF. MBSF 183 may be collocated with the NEF, the MBSTF is a network function, in which, when the MBSF 183 is deployed, MBSTF may be deployed as well.

MBSF 183 may perform the following functions to support 5MBS: 1) Service level functionality to support 5MBS, or interworking with LTE MBMS: 2) Interacting with AF and MB-SMF for MBS session operations, determination of transport parameters, or session transport: 3) Selection of serving MB-SMF for an MBS Session: 4) Controlling MBSTF if the MBSTF is used: or 5) Determination of sender IP multicast address for the MBS session if IP multicast address is sourced by MBSTF.

The MBSTF may perform the following functions to support 5MBS if deployed: 1) Media anchor for MBS data traffic if needed: 2) Sourcing of IP Multicast if needed; 3) Generic packet transport functionalities available to any IP multicast enabled application such as framing, multiple flows, packet FEC (encoding): or 4) Multicast/broadcast delivery of input files as objects or object flows.

There following service levels for the multicast communication service may be defined: 1) basic service level: or 2) enhanced service level: with additional features on top of basic service level.

The basic service level may include the following requirements: 1) Media transported transparently through the 5GS: 2) Request to receive the multicast (e.g., MBS) service: 3) Packet distribution from the 5GS ingress to (R)AN node(s); or 4) Data delivery from (R)AN node(s) to the UE. The enhance service level may include: 1) Local MBS service: 2) User authentication and authorization: 3) Explicit configuration of multicast session by network function external to the 5GS including Group member management: or 4) Enhanced QoS support.

5G MBS Session Management

In order to transfer the multicast/broadcast service data flow through 5GC, MBS sessions may need to be established and maintained. An MBS session may be identified by the MBS session ID throughout the 5G system transport on external interface towards AF and between AF and UE, and towards the UE. The MBS Session ID may be formatted in one of the following: 1) Temporary Mobile Group Identity (TMGI) (e.g., for MBS broadcast or MBS multicast session): or 2) source specific IP multicast address (e.g., for MBS multicast session only).

UE 102 may obtain MBS Session ID via MBS service announcement. For MBS multicast Session, a source specific IP multicast address may be a globally unique identifier and may be assigned by 5GC or an external network.

Figure 6:
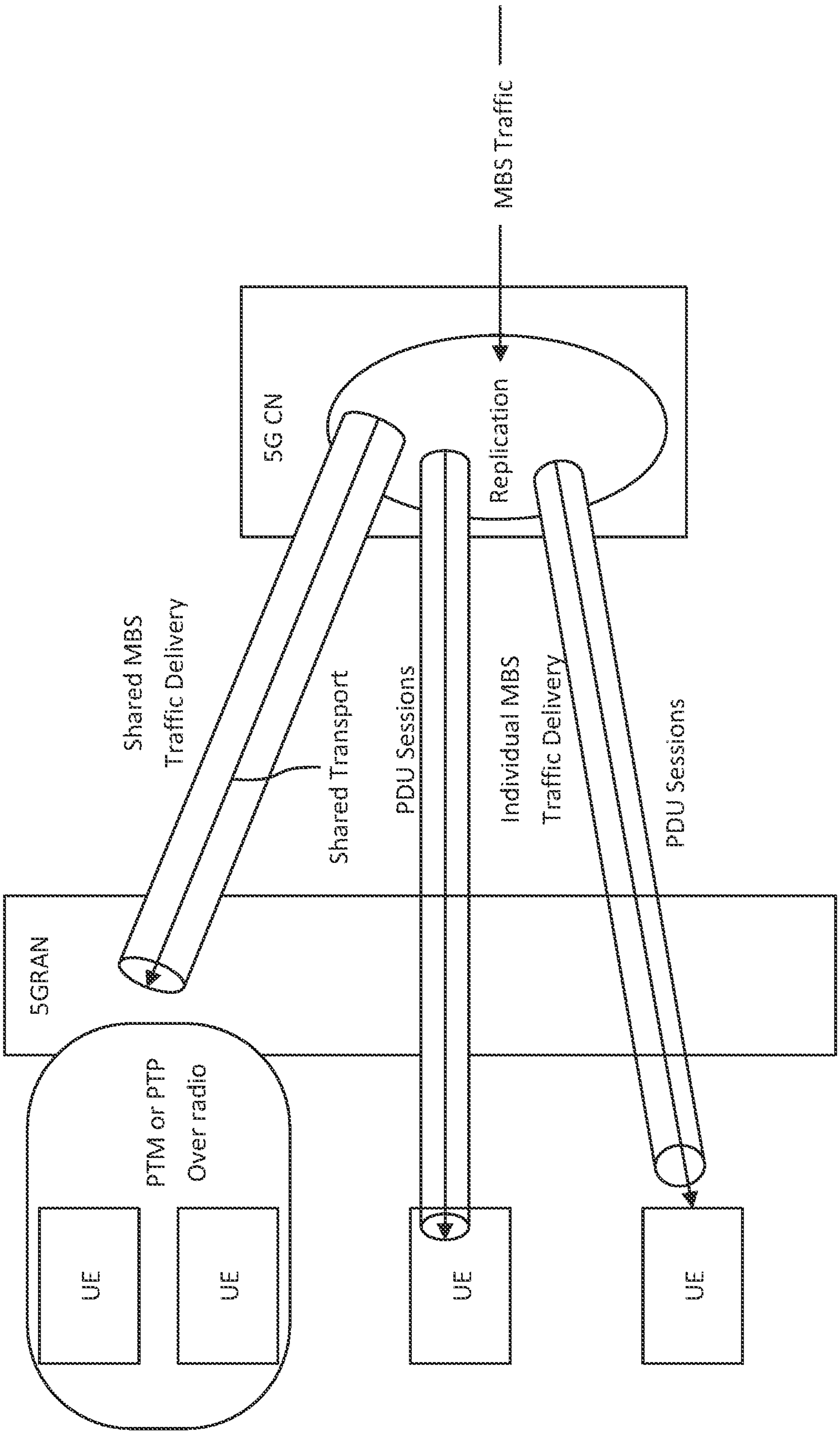
FIG. 6 illustrates an exemplary 5GC Shared/Individual MBS traffic delivery method.

A 5GC shared MBS traffic delivery method and 5GC Individual MBS traffic delivery method may be standardized. The 5GC Shared MBS traffic delivery method is conventionally always mandatory, and 5GC Individual MBS traffic delivery is conventionally required to support UE mobility to/from non-MBS-capable NG-RAN nodes, but otherwise optional. NG-RAN here (and FIG. 5), may be the same as RAN node 105 in FIG. 7. The network may be able to support selection of 5GC Shared MBS traffic delivery method or 5GC Individual MBS traffic delivery method based on criteria of whether RAN node supports 5MBS or not. The concepts are illustrated in FIG. 6.

For 5GC Individual MBS traffic delivery, 5G CN may receive a single copy of MBS data packets and may deliver separate copies of those MBS data packets to individual UEs via per-UE PDU sessions, hence for each such UE one PDU session is required to be associated with a multicast session. For 5GC shared MBS traffic delivery, 5G CN may receive a single copy of MBS data packets and may deliver a single copy of those MBS data packets to a RAN node.

An MBS session may be in different states, such as configured, active and inactive. Correspondingly, there are multiple MBS session management procedures, such as multicast session configuration, multicast session establishment, multicast session activation, multicast session deactivation, multicast session release, or multicast session deconfiguration.

With reference to Multicast Session Configuration, The AF can provide information about the multicast session and/or request the allocation of a TMGI. Alternatively, there is network-internal configuration of the multicast session. No resources or only resources at MB-SMF, NEF and MB-UPF are reserved, and no multicast data are transmitted. The configuration may indicate whether or when the multicast session may be established and whether a multicast session can become inactive. The AF may provide configuration in several steps, e.g., to first request TMGIs and then provide full information about the multicast session and allow it to be established.

With reference to Multicast Session Establishment, when the join request of the first UE in the multicast session is accepted, the multicast session is established either in inactive or active state, depending on configuration. 5GC resources for the multicast session are being reserved.

With reference to multicast session activation, there may be state transition from inactive to active multicast session. CM IDLE UEs that joined the multicast session may be paged. Activation may be triggered by AF request or reception of multicast data.

With reference to multicast session deactivation, there may be state transition from active to inactive multicast session. Deactivation may be triggered by AF request or no reception of multicast data.

With reference to multicast session release, resources for the multicast session may be released in both 5GC nodes and RAN nodes 105, UEs 102 that joined the multicast session are notified. The release is possible for an active or inactive multicast session. The release may be combined with the deconfiguration of a multicast session.

With reference to multicast session deconfiguration, information about the multicast session is removed from the 5GC and TMGIs are deallocated.

UE 102 may perform application-level join/leave to a multicast session, the 5GC may support multicast session join/leave operation for a user, e.g., based on AF request. Alternatively, UE 102 may join/leave multicast session via control plane signaling, such as NAS signaling for session management procedure. The (MB-)SMF 173 may determine whether to accept join requests, which may be based on input from NEF 196/MBSF 183 if MBSF 183 is used, and stores that the served UE 102 is participating in a multicast session. When UE 102 joins an active MBS session, it may have to be in CM-CONNECT state: while if UE 102 joins an inactive MBS session, it may be in CM-IDLE state or CM-CONNECTED state.

An inactive MBS session may not have any ongoing multicast data transmission. Therefore, when UE 102 joins an inactive MBS session, UE 102 may enter CM-IDLE state. Once the content provider (e.g., application server or AF 188) determines to start the multicast data transmission over the inactive MBS session, the content provider may request the core network (e.g., SMF/MB-SMF 173) to activate the MBS session. If there are any UEs 102 that join the multicast group and are in CM-IDLE state, the network (e.g., MB-SMF 173/SMF 174/AMF 172) may determine which set of UEs 102 are in the CM-IDLE state and send a notification to those UEs 102 so that they can transition out of the CM-IDLE state and receive the multicast transmission. In other words, the network may page those UEs 102 to get them into CM-CONNECTED, so that those UEs 102 are able to receive the multicast data. However, the following issues should be addressed.

With reference to a first issue, the network may need to first identify which UEs 102 are in the CM-IDLE state. According to 3GPP TR 23.757 and 3GPP TS 23.247, SMF and MB-SMF are in charge of MBS session management activities. However, they do not have the UE's CM state information to decide which UEs 102 to page. On the other hand, the AMF 172 may be responsible for connection management and initiating the paging process by contacting the RAN node, although the AMF 172 may not be involved in MBS session management process. Therefore, at least the following 2 issues may be addressed herein: 1) which network function may be used to determine the set of UEs 102 that will be paged, and 2) how the network function obtains (e.g., receives) the necessary information to make the decision. It is also noted that UEs 102 that are in CM-IDLE may be served by different AMFs 172/SMFs 174. However, one MBS session will be managed by only one MB-SMF 173.

With reference to a second issue, once the AMF 172 has a list of UEs 102 to be paged, it may send an N2 paging message to RAN node 105. The problem is how the AMF 172 sends one N2 paging message to a RAN node 105 to page multiple UEs 102 and how the AMF 172 may send a single message to multiple RAN nodes 105 to page a group of UEs 102 and what information is included in the message. Some detailed issues are to be solved. For example, which network function decides whether to use group paging for signal efficiency or to use traditional paging methods to page the UE 102 in the list one by one? How does the network function make the decision and based on what information if group paging is selected, and if the different UEs 102 are served by different RAN nodes 105, whether the AMF 172 may send one N2 paging message to the involved RAN nodes 105 at once or send one message to each of the RAN nodes 105 respectively? If AMF 172 sends one message to each RAN node 105, is it possible for AMF 172 to use the group ID in the paging message instead of individual UE ID? Moreover, in case that multiple AMFs 172/SMFs 174 are involved, how the MB-SMF 173 notifies those SMFs 174 or AMFs 172 to page those IDLE UEs to initiate the group paging process?

With reference to a third issue, it is desired to determine whether a new group paging method may require some changes or have some impact on existing control plane procedures (e.g., NAS signaling) between UE 102 and the network (e.g., MB-SMF 173, SMF 174, AMF 172, NG-RAN, RAN 105, or another network node). For example, UEs 102 may need to know whether a page is based on multicast group identified by group ID instead of a UE ID which is used in the legacy paging. What procedure does the network use to deliver such information to UEs? What triggers the network to send this information? In addition, the UE 102 may need to inform the network whether it supports group paging, or the granularity of group paging it prefers/supports (e.g., per registration area, per cell or per MBS service area). The paging process may trigger each individual UE 102 to start the service request procedure to get the UE 102 to transition to the CM-CONNECTED state. It is desired to modify certain NAS messages exchanged between UE 102 and the network to facilitate the group paging. Moreover, after group paging is performed, it is desired to determine whether the group paging has impacts on the subsequent NAS procedures, such as service request.

With reference to a fourth issue, it is assumed in the above discussion that the RAN node 105 supports the 5G MBS and group paging feature. However, in some cases, the RAN node 105 may not support group paging or does not support any MBS feature at all. For example, a RAN node 105 may be compatible to 5G release 15/16 when the 5G MBS is not specified. Therefore, a mechanism, as disclosed herein, may be used to page a group of UEs 102 for signaling efficiency when RAN nodes cannot perform group paging.

In view of the aforementioned, disclosed herein are some mechanisms and information elements that may address the highlighted issues.

The disclosed subject matter may address a signaling efficiency issue when the network aims to page a group of UEs 102 in a multicast group so that the UEs 102 switch from CM-IDLE state to CM-CONNECTED state. The following mechanisms are disclosed.

A first mechanism may include a method of group paging performed during the MBS session activation procedure that may be used when the RAN node 105 serving the UE 102 supports the group paging mechanism.

A second mechanism may include a mechanism of paging a group of UEs in the multicast group that may be used if the RAN node 105 serving the UE 102 does not support the group paging mechanism. For example, first, a Group ID is used to page the UE 102, so that the UE 102 knows the paging is related to a multicast group. Second, in the scenario where the RAN node 105 serving the UE 102 does not support the group paging mechanism, the network may update the RFSP index for the UE 102 so that UE 102 is more likely to select a RAN node 105 that supports the group paging or 5G MBS service.

A third mechanism may include one or more modifications to existing control plane procedures between the UE 102 and the network to facilitate the group paging. For a first approach, a support indication may be sent from the UE 102 for the group paging during the registration related procedures. For a second approach, enhancements to the paging procedures and service request procedures are described herein for the case in which a UE 102 camps on a non-supporting RAN Node. A service request may be used to trigger the UE to establish or activate an MBS session. A service request may also trigger the UE 102 to execute a handover from a non-supporting RAN node to a supporting RAN node. For a third approach, the paging or service request procedures may be enhanced to support 5MBS in scenarios where a UE 102 camps on a supporting RAN node.

Group Paging when RAN Node Supports Group Paging

Disclosed herein are methods or systems for performing group paging during the MBS session activation procedure assuming that the involved RAN node supports group paging.

Note that the UE ID or group ID may be included in the N2 paging message or RRC paging message to page the UE 102. The UE ID may refer to 2 types of IDs. A first type of UE ID may be an ID included in the actual paging record such as 5G-GUTI or 5G-S-TMSI; and the second type of UE ID may be used for the calculation of the PF and the PO, which is a shortened version of the UE ID included in the paging record. Similarly, the group ID may refer to 2 types of IDs. A first group ID may be the actual group ID to identify a multicast group such as TMGI. The second group ID may be a short version of the TMGI which may be used to calculate the group specific paging frame or paging occasion by the RAN node 105.

Group paging may be performed during the MBS session activation procedure, which may be triggered by the multicast data notification sent from MB-UPF 175 to MB-SMF 173 or by an AF request. Moreover, the MBS session activation may be combined with the MBS session modification procedure, where the AF 188 may want to update the MBS session context for a multicast application and start the multicast data transmission over an MBS session. The following issues may be addressed for performing the group paging.

For the first group paging issue, the network may determine if the UE(s) 102 supports group paging. Also, the network may determine which UE(s) 102 should be paged.

For the second group paging issue, the network may determine how the group paging is performed. The paging may include 2 stages. In a first stage, AMF 172 may send a N2 message to the RAN node 105 and, in a second stage, then RAN node 105 may send RRC paging message to UEs 102. The group paging discussed throughout may focus on the first stage that the network intends to page a group of UEs 102 by using one N2 message. In other words, the AMF 172 may send one N2 paging message to a RAN node 105, which then pages a group of UEs 102. It is up to RAN node 105 to decide how to page the UE 102 in AS layer. Alternatively, the AMF 172 may send one N2 paging message to multiple RAN nodes 105 through the shared N2 connection.

FIG. 7 illustrates exemplary group paging as a part of MBS session activation procedure. At step 210 of FIG. 7, pre-requisites may be completed, such as the MBS session has been established in an inactive state or the UE 102 has joined the MBS session.

At step 211*a* of FIG. 7, MB-UPF 175 may send a data notification to MB-SMF 173 which may be based on MB-UPF 175 receiving multicast data or determining that the MBS session is inactive.

At step 211*b* of FIG. 7, AF 188 (or application server) may also send a request to MB-SMF 173 to activate an inactive MBS session to start multicast data transmission. Alternatively, to step 211*b*, if an MBSF 183 is deployed in the network, the AF may send the request activate an inactive MBS session to the MBSF 183 and the MBSF may forward the message to the MB-SMF 173.

At step 212 of FIG. 7, based on the MBS session ID (e.g., the group ID in the form of TMGI or source specific IP multicast address), MB-SMF 173 may maintain a list of UEs 102 that have joined the multicast group. In addition, MB-SMF 173 may determine the SMFs 174 that serve those UEs 102. If the MB-SMF 173 does not store such information internally, MB-SMF 173 may query the UDM 197/UDR 178 to find those SMFs 174. As a result, MB-SMF 173 may send the MBS session activation request to each of those SMFs 174. The request message may include the UE ID, multicast group ID, when the multicast data transmission may start, and MBS session context information. The MBS session context information may include the MBS service area, QoS parameters, MB-UPF ID, or N3 tunnel information. In addition, MB-SMF 173 may include the group paging configuration information in the request, such as whether the group paging is enabled or preferred if some UEs 102 are in CM-IDLE, and whether the group paging is performed based on MBS service area or registration area of UE 102. It is possible that the group paging configuration depends on the location or the number of UEs 102 to be paged. For example, in some location areas, group paging may be enabled and is per tracking area, registration area or per cell. In some other location area, it may be performed per service area. For all other locations, group paging may not be preferred, (e.g., regular paging will be used). Alternatively, this configuration for paging may be performed by PCF with the inputs from MB-SMF 173 and MBSF 183. The PCF 184 may provide the paging configuration to the involved AMFs 172.

At step 213 of FIG. 7, each SMF 174, based on the UE ID, finds the serving AMF 172, and sends the MBS session activation notification to the serving AMF 172 notifying that an MBS session may be activated. The SMF 174 also includes the group paging configuration if MB-SMF 173 may provide the information in step 212 of FIG. 7. Note that there may be more than one AMFs 172 that serve the UEs 102 in the group.

At step 214 of FIG. 7, based on UE ID, the AMF 172 determines whether a UE 102 needs to be paged. In addition, based on group paging configuration and whether the RAN node 105 supports group paging, AMF 172 determines whether to use the group paging to reach the UE 102.

At step 215 of FIG. 7, AMF 172 may send an N2 message to each of RAN node 105 that serves the UEs 102. The AMF 172 may include the group ID of the multicast group (e.g., TMGI or source specific IP multicast address), UE IDs and the paging configuration information. The paging configuration information is similar to those discussed in step 212 of FIG. 7. Moreover, the AMF 172 forwards the MBS session context information to the RAN node 105 as well.

At step 216 of FIG. 7, RAN node 105 sets up the radio resource based on the MBS session context information. RAN node 105 also decides how to page the UE 102 in the AS layer. Even if the group paging is used by AMF 172, it mainly implies that one N2 paging message is used to page a group of UEs 102. It is possible that the RAN node 105 decides to page the UE 102 individually. For example, RAN node 105 may find out that there is only one UE 102 in the cell that is to be paged.

At step 217 of FIG. 7, RAN node 105 may send the paging message to the UE 102 with group ID (e.g., TMGI to identify the multicast group) inserted, so that UE 102 knows the paging is caused by a multicast group. Also RAN node 105 may indicate when the multicast transmission starts. The paging message may include the identity of the UE 102 that is being paged (e.g., 5G-S-TMSI) and may further indicate that the identified UE 102 is being paged for group messaging (e.g., multicast) and may further indicate to the UE 102 the group ID that is associated with the group messaging. The group ID may be hashed, or encoded, with the UE's International Mobile Subscriber Identity (IMSI) such that other UE's will not be able to easily determine the group ID.

In addition, the network may generate a new group ID based on TMGI and send the new group ID to the RAN node 105. The new group ID may be used by RAN node 105 to calculate the group specific paging frame and paging occasion. In other words, the UEs 102 joining the group may listen to the group paging at the group specific paging frame (PF) or paging occasion (PO). Moreover, the network may try to align the group specific PF and PO with UE's PF and PO. In other words, the MBS DRX cycle may have a proportional relationship to the UE individual DRX cycle.

At step 218 of FIG. 7, RAN node 105 may send N2 message to AMF. Since RAN node 105 may need to establish the N3 tunnel with MB-UPF for the upcoming multicast transmission, the N2 message to AMF 172 includes the MB-UPF 175 information and N3 tunnel information.

At step 219 of FIG. 7, AMF 172 may forward the message to the MB-SMF 173, which may further contact MB-UPF 175 to make N3 tunnel ready for the multicast data transmission.

At step 220 of FIG. 7, as the response to the AF 188 request shown in step 211*b* of FIG. 7, MB-SMF 1723 may send a response to AF 188 indicating that the MBS session is activated.

Alternative to step 212 of FIG. 7 or step 213 of FIG. 7, MB-SMF 173 may send MBS session activation request directly to AMFs 172 that serve the UEs 102 in the group. This may require that the MB-SMF 173 knows which AMFs 172 are serving the UEs 102 in the multicast group.

With reference to step 212 of FIG. 7—step 215 of FIG. 7, MB-SMF/SMF 173 may provide a list of UEs 102 in the multicast group, and AMF 172 identifies whether a UE 102 is in CM-IDLE and whether RAN node 105 supports the group paging. It is also possible that MB-SMF 173/SMF 174 may maintain the RAN node 105 group paging capability and may send this information to the AMF 172. This may require some extra message exchange when a UE 102 joins the group. Specifically, the AMF 172 may send this information to the MB-SMF 173/SMF 174 based on the request.

Note that if a source specific IP multicast address is used as the group ID to identify the multicast group, the MB-SMF 173 is responsible for translating the source specific IP multicast address to TMGI because the RAN node 105 may not be able to put the whole source specific IP multicast address into the paging message. MB-SMF 173 can do this by maintaining 1:1 mapping or with the assistance of the MBSF 183 which keeps the mapping between TMGI and source specific IP multicast address. In case that the MBSF 183 is not deployed, the MB-SMF 173 may contact the AF 188 via the NEF 196 to get the mapping information, or the NEF 196 keeps the mapping information.

Group Paging when RAN Node does not Support Group Paging

There may be situations in which the group paging during the MBS session activation procedure assuming the involved RAN node 105 does NOT support the group paging. Therefore. RAN node 105 may only use the legacy paging mechanism to page the UE 102.

One option is that the paging message may be enhanced to include a group ID (e.g., TMGI) to indicate that this paging is for a multicast group that UE 102 joins, so that the UE 102 knows that the paging is related to the MBS session, and the UE 102 initiates the service request procedure by including the MBS session information (e.g., MBS session ID) or some UE information such as the location of UE 102. The AMF 172 may use the group ID in the N2 paging message sent to the RAN node 105. In addition. RAN node 105 may also insert the group ID into the RRC paging message sent to UE 102. Each UE 102 still listens to the paging message by calculating paging occasion based on UE ID, while the paging message includes the group ID of the multicast group. UE ID, or both. The network (e.g., MB-SMF 173/SMF 174/AMF 172) may provide such information to the RAN node 105 as well. It may be up to the RAN node 105 to determine whether to include only group ID, UE ID, or both UE ID and group ID in AS layer paging message. Alternatively, the MB-SMF 173/AMF 172 may decide what ID to be included in the paging message and provide the instruction to the RAN node 105.

Moreover, the network may provide inputs to the UE's cell selection or RAN node selection by considering whether the RAN node 105 supports the 5G MBS service or group paging if UE 102 indicates that it supports one or both. If the UE 102 indicates the support in the message sent to AMF 172 (e.g., message may be a registration request), the AMF 172 may inform the PCF 184 that the UE 102 has joined an MBS session and supports the 5G MBS service or group paging. The PCF 184 may consider this information when determining an RFSP index for the UE 102. In other words, the PCF 184 may consider the UE's support for 5MBS and the UE's 102 desire to access 5MBS services when determining the RFSP Index. The RFSP index may be selected such that the UE 102 will not select or prefer the cells that do not support 5MBS. In other words, the UE 102 is less likely or even unlikely to select the cells that do not support 5G MBS service or group paging. The AMF 172 may then provide the updated RFSP index to the RAN node 105, thus decreasing the likelihood that the UE 102 will select a cell that does not support multicast or group paging. The PCF 184 can use the UE configuration update procedure to send the updated RFSP index to the UE 102. In case that the UE 102 indicates the support to the SMF 174/MB-SMF 173 during MBS session management procedure, which is transparent to the AMF 172, then the SMF 174/MB-SMF 174 notifies the AMF 172 which informs the PCF 184 to update the RSFP index for the UE 102. Another option is that SMF 174/MB-SMF 173 directly informs the PCF 184 to trigger the RFSP index update for the UE 102.

RAN Node 105 may broadcast an indication whether it supports 5G MBS services or group paging. UE 102 may use this information during cell selection in order to determine whether to camp on the RAN node 105 especially when UE 102 has intention to join or already joins a multicast group. Thus, decreasing the likelihood that the UE 102 may select a cell that does not support multicast or group paging.

Changes to Existing Control Plane Procedures to Support Group Paging

To apply the group paging, there may be certain modifications required to the conventional control plane procedures between the UE 102 and the network. Disclosed herein is the possible impact and mechanisms to address such impact to update those procedures to enable the group paging for an MBS session.

Support Indications from the UE

In the registration request or registration update request message, UE 102 may indicate to network that it supports the group paging and supports/prefers to use TMGI as paging identifier once it joins a multicast group. The preference or support for group paging may be associated with an application, network slice, or the location (MBS service area, registration area, or tracking area).

As disclosed herein, the UE 102 may determine that a RAN node 105 supports group paging or the 5G MBS feature in general by examining the RAN Node's SIB. When the UE 102 sends an RRC Request to the RAN node 105, the UE 102 may indicate in an RRC message that the UE 102 supports group paging or the 5G MBS feature in general. The RAN node 105 may use this information later when determining how to page the UE 102. The UE 102 may choose to not indicate support for group paging or 5MBS when it sends an RRC message to a RAN node 105 that did not indicate in the SIB that the RAN node 105 supports group paging or 5MBS.

When the UE 102 sends a Registration request to an AMF 172, the UE 102 may indicate to the AMF 172, in the NAS part of the Registration Request, that the UE 102 supports group paging or the 5G MBS feature in general. The AMF 172 may use this information later when determining how to page the UE 102. For example, the AMF 172 may attempt to assign 5G-GUTIs for all UEs 102 in a multicast group such that the resulting paging frame or paging occasion calculations for the UEs 102 are aligned (e.g., overlap in time) where the UEs 102 in the group may monitor for paging at the same time. In addition, the AMF 172 may also provide a temporary ID to the UE 102 in NAS messaging. The temporary ID may be used in paging messages sent by the RAN node 105 to indicate that a page is for the multicast group. Then when the AMF 172 needs to perform group paging, the AMF 172 may send to the RAN node 105 a UE ID that aligns with the desired PO but with the temporary ID (or group ID) to signify to the UEs 102 in the group that the page is for the multicast group.

An alternative mechanism for ensuring paging occasion alignment between the UEs 102 in the group, a new "group paging ID" is also proposed. If it is provided to the UE, it indicates to the UE 102 that the paging occasions should be calculated based on the group paging ID, instead of the individual UE ID such as 5G-GUTI. This allows for the 5G-GUTI to be kept unchanged, as a change affects functionality beyond paging occasion calculation. At the same time, if the UE 102 camps on a non-supporting RAN node 105, the group paging ID proposed can be used as the temporary ID also described in this disclosure.

In other words, the UE 102 may be instructed to use a group ID to calculate its paging occasions. This paging occasion may be used by the UE 102 to receive both group paging messages and paging messages that are associated with unicast PDU Sessions (e.g., PDU Sessions that are not associated with 5MBS). The advantage of this approach is that the UE's 5G-GUTI does not need to change and does not need to be constructed in any special way and the UE 102 may only need to monitor a single paging occasion for both group and non-group pages.

Paging a UE that is Camped on a Non-Supporting RAN Node

Paging

When an AMF 172 determines that a UE 102 needs to transition into the CM-CONNECTED state in order to receive the multicast data and the UE 102 is camped on a RAN node 105 that does not support group paging, the AMF 172 may use existing procedures to page the UE. In other words, it may send N2 Message to the RAN node 105 requesting that the UE 102 be paged just as the AMF 172 would do if downlink data arrived for a unicast PDU Session of the UE. However, if the AMF 172 had assigned 5G-GUTIs for all the UEs in the multicast group such that their PO calculations are aligned (e.g., overlap in time), then the AMF 172 may include in the N2 message the temporary ID as previously proposed. The temporary ID may be used to implicitly indicate group paging to the UEs in the multicast group for the case when the RAN node 105 does not explicitly support group paging, e.g., does not support paging with a group ID. In other words, the UE 102 will associate itself with multiple identifiers, monitor a paging occasions that is associated with each identifier, and determine the reason for the page based on the identifier that is included in the paging message.

Service Request Procedure

As disclosed earlier, the UE 102 may detect that a RAN node 105 does not support group paging based on the fact that the RAN node 105 not broadcast a support indication. When the UE 102 is paged by a RAN node 105, and provided that the UE 102 previously detected that the RAN node 105 does not support group paging, the UE 102 may respond to the page by sending a service request to the AMF 172. The UE 102 may provide to the AMF 172 a list of MBS sessions that the UE 102 has joined in the service request message. Moreover, the UE 102 may also provide the associated unicast PDU session for each MBS session to AMF 172. In the request, UE 102 may also indicate to AMF 172 whether it supports group paging and the UE's preference on paging method (e.g., UE 102 prefers group paging or legacy paging) for an MBS session.

If the MBS Session, which caused the AMF 172 to page the UE 102 is present in the list of MBS sessions, then the service accept message from the AMF 172 to the UE 102 may include an information element that indicates the MBS session status to the UE 102. For example, the information element may indicate that the MBS session is active. AMF 172 may query the SMF 174/MB-SMF 173 to find out the MBS session status. If there are multiple SMFs 174 that are associated with the UE 102, AMF 172 will be responsible for determining the SMF 174 that serves the MBS session for the UE 102 with the assistance of NRF/UDM 197 if necessary. This could be determines based on DNN, S-NSSAIs, MBS session ID or UE ID. Alternatively, the AMF 172 may forward the MBS session activation notification message to the RAN node 105 and to the UE 102 to indicate that the MBS session is activated which is similar to step 215 in FIG. 7. In this case, the MBS session status is transparent to the AMF 172.

If the page is not triggered by MBS session activation and the AMF 172 finds out that the UE 102 prefers the group paging for some MBS sessions that are inactive, the AMF 172 may request that the serving RAN node 105 handover the UE 102 to a target RAN node 105 that supports the group paging or 5G MBS service. AMF 172 can directly request source RAN node 105 to initiate the handover or include the handover information in the message to the UE 102 as the response to the service request message. So, the UE 102 can start cell selection to select a target RAN node 105 and then initiate the handover.

Reception of the MBS session status may trigger the UE 102 to establish or activate an MBS PDU session in case the page is not caused by the MBS session activation. For example, reception of the MBS session status may cause the UE 102 to send a service request to activate or establish a PDU session that is associated with the MBS session so that the session data may be received via unicast.

Paging a UE that is Camped on a Supporting RAN Node

Paging

When an AMF 172 determines that a UE 102 needs to transition into the CM-CONNECTED state in order to access a multicast service and the UE 102 is camped on a RAN node 105 that does support group paging, the AMF 172 may request that the RAN node 105 page the UE 102 and provide to the RAN node 105 a group identifier that is associated with the MBS session that the UE 102 joins. The RAN node 105 may then include the group identifier in the paging message so that when the UE 102 checks the paging message, UE 102 may determine that it was paged in order to activate the MBS session.

Service Request Procedure

As disclosed herein, the UE 102 may detect that a RAN node 105 does support group paging based on the RAN node 105 broadcasting a support indication. When the UE 102 is paged by a RAN node 105, and the UE 102 previously detected that the RAN node 105 does support group paging, the UE 102 may respond to the page by sending a service request to the AMF 172. The service request message may indicate to the AMF 172 that the service request is in response to a group page and the service request may include the group ID that the UE 102 detected in the paging message. The UE 102 may also provide a list of MBS sessions that the UE 102 has joined to the AMF 172 in the service request message. Additionally, in the RRC part of the message, the UE 102 may indicate that it is responding to a group page, and it wishes to activate the MBS session.

If the MBS Session which caused the AMF 172 to page the UE 102 is present in the list of MBS sessions, then the service accept message from the AMF 172 to the UE 102 may include an information element, which indicates to the UE 102 the 5MBS session status. For example, the information element may indicate that the 5MBS session is active.

Figure 8:
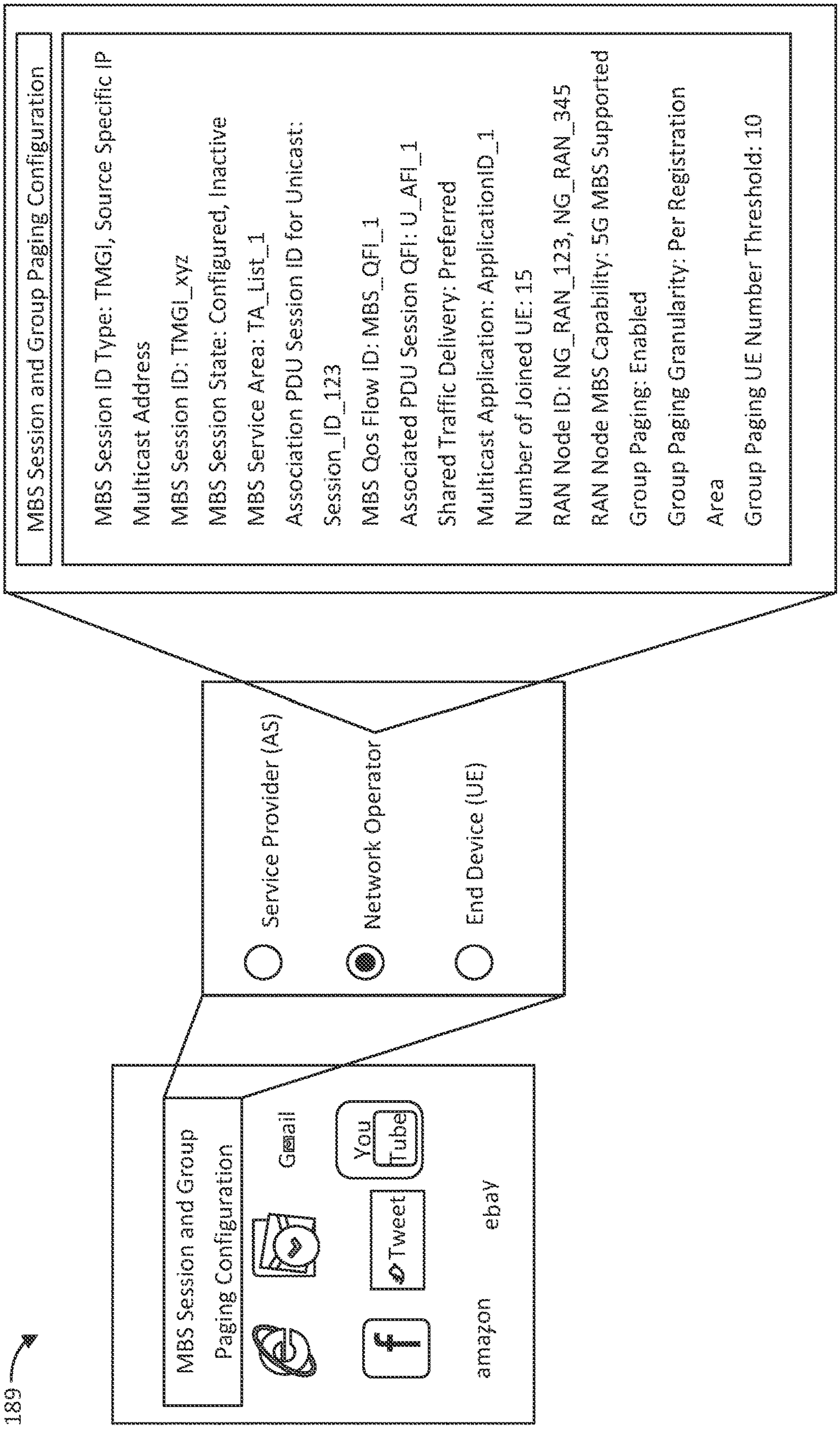
FIG. 8 illustrates an exemplary an exemplary user interface.

FIG. 8 illustrates an exemplary an exemplary user interface. The parameters used in MBS session activation and group paging can be configured by the network operator, application service provider, or end users (e.g., UEs). The user interface 189 may be implemented for configuring or programming those parameters with default values, as well as enabling or disabling the group paging.

Furthermore, a graphical user interface (GUI) (e.g., user interface 189) may display a message when the UE 102 detects that a 5MBS session is beginning. The mobile termination (MT) part of the UE 102 may send a notification to an application that is hosted in the terminal equipment (TE) part of the UE 102 to notify the application that the 5MBS session is beginning. The notification may be an AT command. The AT command may include a group ID or a human readable name that was determined by the Mobile Termination (MT) from the group ID.

It is understood that the entities performing the steps illustrated herein, such as FIG. 1-FIG. 8, may be logical entities. The steps may be stored in a memory of, and executing on a processor of, a device, server, or computer system such as those illustrated in FIG. 3F or FIG. 3G. Skipping steps, combining steps, or adding steps between exemplary methods disclosed herein (e.g., FIG. 7) is contemplated. Table 1 provides abbreviations and definitions.

TABLE 1

Abbreviations and Definitions

| Abbreviations | Definitions |
|---|---|
| 5GC | 5G Core Network |
| AF | Application Function |
| AMF | Access and Mobility Management Function |
| APN | Access Point Name |
| AS | Application Server |
| CM | Connection Management |
| CN | Core Network |
| CP | Control Plane |
| EPC | Evolved Packet Core |
| EPS | Evolved Packet System |
| GUTI | Globally Unique Temporary UE Identity |
| IE | Information Element |
| IMSI | International Mobile Subscriber Identity |
| LTE | Long Term Evolution |
| MBS | Multicast/Broadcast Service |
| MBSF | Multicast/Broadcast Service Function |
| MBSTF | Multicast/Broadcast Service Transport Function |
| MM | Mobility Management |
| MME | Mobility Management Entity |
| MT | Mobile Termination |
| NAS | Non-Access Stratum |
| NEF | Network Exposure Function |
| NF | Network Function |
| NRF | Network Repository Function |
| NSI | Network Slice Instance |
| NSSF | Network Slice Selection Function |
| NWDAF | Network Data Analytics Function |
| PCC | Policy and Charging Control |
| PCF | Policy Control Function |
| PDU | Packet Data Unit |
| Qos | Quality of Service |
| NG-RAN | New Generation Radio Access Network |
| RFSP | RAT/Frequency Selection Priority |
| SSC | Session and Service Continuity |
| SM | Session Management |
| SMF | Session Management Function |
| S-NSSAI | Single Network Slice Selection Assistance Information |
| TMGI | Temporary Mobile Group Identity |
| TE | Terminal Equipment |
| UE | User Equipment |
| UDM | Unified Data Management |
| UL | Uplink |
| UPF | User Plane Function |

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHZ, and the provision of new ultra-mobile broadband radio access above 7 GHZ. The flexible radio access is expected to consist of a new, non-backwards compatible radio access in new spectrum below 6 GHZ, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHZ, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eMBB) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

In describing preferred methods, systems, or apparatuses of the subject matter of the present disclosure—group paging for signal efficiency in 5G network—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein).

Methods, systems, and apparatuses, among other things, as described herein may provide for MB-SMF, based on UE ID, locating serving SMF and sending an MBS session notification to each SMF: SMF, based on UE ID, locating the serving AMF and sending each AMF an MBS session activation notification to AMF: AMF sending paging message to RAN node to page those UEs that are in CM-IDLE state; and RAN node sending paging message to each IDLE UE by including MBS session ID or group ID. MB-SMF may provide a list of UEs that join the group to SMF and AMF. MB-SMF may determine if the UE needs to be paged based on UE ID and notify the SMF and AMF. MB-SMF, based on whether RAN node support s group paging, may determine whether to use group paging or legacy paging to page the UE, and notify the AMF via SMF. All combinations in this paragraph and the below paragraph (including the removal or addition of steps) are contemplated in a manner that is consistent with the other portions of the detailed description.

Methods, systems, and apparatuses, among other things, as described herein may provide for transmitting an N2 message to a radio access network (RAN) node, wherein the RAN node serves a wireless transmit/receive unit (WTRU) that has joined a multicast service, wherein the multicast service is associated with a group identifier (ID), and wherein the N2 message is a request to page a group of WTRUs, the request comprises the group ID: and receiving a service request from the WTRU. Methods, systems, and apparatuses, among other things, as described herein may provide for joining a multicast service of a network: receiving a paging message from the network, the paging message comprises a group identifier (ID) that is associated with the multicast service; and sending, based on the paging message, a service request to the network. The apparatus may be a WTRU or network node (e.g., AMF, SMF, etc.). The group ID may be a temporary mobile group identity (TMGI). The group ID may be hashed or encoded version of a temporary mobile group identity (TMGI). The service request may include a multicast/broadcast service (MBS) session ID that may be associated with the multicast service. The service request may include an indication that the service request was triggered by a paging message that includes the group ID. Methods, systems, and apparatuses, among other things, as described herein may provide for sending an indication that the apparatus supports receiving paging messages that comprises the group ID. The apparatus may include a MT that sends a notification to the TE part of the apparatus when there is an indication that the multicast service has begun. The notification may be sent via an AT command. The group ID may be determined by hashing or encoding a temporary mobile group identity (TMGI) with a subscriber identity (e.g., IMSI) of the apparatus. All combinations in this paragraph (including the removal or addition of steps) are contemplated in a manner that is consistent with the other portions of the detailed description.

What is claimed is:

1. A wireless transmit/receive unit (WTRU) comprising:
a processor; and
a memory coupled with the processor, the memory comprising executable instructions stored thereon that when executed by the processor cause the WTRU to effectuate operations comprising:
join a multicast session of a network, wherein the multicast session is associated with a first group identifier (ID) of a multicast group that includes the WTRU;
when connected with the multicast session, enter into a connection management (CM) idle state;
receive a paging message from the network, the paging message comprising a second group identifier (ID) that is associated with the multicast session;
determine that the paging message is associated with the multicast group based on the second group ID being a hashed version of the first group ID that was determined by hashing the first group ID with an ID of the WTRU; and
send, based on the paging message, a service request to the network.

2. The WTRU of claim 1, wherein the first group ID is a temporary mobile group identity (TMGI).

3. The WTRU of claim 2, wherein the second group ID is determined by hashing the temporary mobile group identity (TMGI) with a subscriber identity of the WTRU.

4. The WTRU of claim 1, wherein the service request comprises a multicast/broadcast service (MBS) session ID that is associated with the multicast session.

5. The WTRU of claim 1, wherein the service request comprises an indication that the service request was triggered by the paging message that comprises the second group ID.

6. The WTRU of claim 1, further configured to send an indication that the WTRU supports receiving paging messages that comprise the second group ID.

7. The WTRU of claim 1, wherein the WTRU comprises a mobile termination (MT) configured to send a notification to a terminal equipment (TE) part of the WTRU when there is an indication that the multicast session has begun.

8. The WTRU of claim 7, wherein the mobile termination (MT) is configured to send the notification via an ATtention (AT) command.

9. A method comprising:

joining a multicast session of a network;

when connected with the multicast session, entering into a connection management (CM) idle state, wherein the multicast session is associated with a first group identifier (ID) of a multicast group that includes a wireless transmit/receive unit (WTRU);

receiving a paging message from the network, the paging message comprising a second group identifier (ID) that is associated with the multicast session;

determining that the paging message is associated with the multicast group based on the second group ID being a hashed version of the first group ID that was determined by hashing the first group ID with an ID of the WTRU; and sending, based on the paging message, a service request to the network.

10. The method of claim 9, wherein the service request comprises an indication that the service request was triggered by the paging message that comprises the second group ID.

11. The method of claim 9, wherein the first group ID is a temporary mobile group identity (TMGI).

12. The method of claim 11, wherein the second group ID is determined by hashing the temporary mobile group identity (TMGI) with a subscriber identity of the WTRU.

13. The method of claim 9, wherein the service request comprises a multicast/broadcast service (MBS) session ID that is associated with the multicast session.

14. The method of claim 9, further comprising sending an indication that a wireless transmit/receive unit (WTRU) supports receiving paging messages that comprise the second group ID.

15. The method of claim 9, further comprising sending, by a mobile termination (MT) of a wireless transmit/receive unit (WTRU), a notification to a terminal equipment (TE) part of the WTRU when there is an indication that the multicast session has begun.

16. The method of claim 15, wherein the notification is sent via an ATtention (AT) command.

* * * * *